(12) United States Patent
Yin et al.

(10) Patent No.: US 9,307,527 B2
(45) Date of Patent: *Apr. 5, 2016

(54) SELECTING A CODEWORD AND DETERMINING A SYMBOL LENGTH FOR UPLINK CONTROL INFORMATION

(71) Applicant: Sharp Kabushiki Kaisha, Osaka-shi, Osaka (JP)

(72) Inventors: Zhanping Yin, Vancouver, WA (US); John Michael Kowalski, Camas, WA (US); Shohei Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/616,564

(22) Filed: Feb. 6, 2015

(65) Prior Publication Data

US 2015/0156767 A1 Jun. 4, 2015

Related U.S. Application Data

(63) Continuation of application No. 12/819,170, filed on Jun. 18, 2010, now Pat. No. 8,989,156.

(51) Int. Cl.
*H04B 7/216* (2006.01)
*H04W 72/04* (2009.01)
*H04L 1/00* (2006.01)
*H04L 1/16* (2006.01)
(Continued)

(52) U.S. Cl.
CPC ......... *H04W 72/0413* (2013.01); *H04L 1/0009* (2013.01); *H04L 1/0031* (2013.01); *H04L 1/0073* (2013.01); *H04L 1/1671* (2013.01); *H04L 5/0053* (2013.01); *H04W 72/0466* (2013.01); *H04L 5/0023* (2013.01); *H04W 48/16* (2013.01); *H04W 76/02* (2013.01)

(58) Field of Classification Search
None
See application file for complete search history.

(56) References Cited

U.S. PATENT DOCUMENTS 8,989,156 B2 * 3/2015 Yin et al. ............... 370/335
2009/0073922 A1 3/2009 Malladi et al.
(Continued)

FOREIGN PATENT DOCUMENTS

CN 101702631 A 5/2010
JP 2009177462 8/2009
(Continued)

OTHER PUBLICATIONS

Sharp, "Performance Issued for UCI Transmission on PUSCH with SU-MIMO," R1-103208, May 10, 2010.
(Continued)

*Primary Examiner* — Minh-Trang Nguyen
(74) *Attorney, Agent, or Firm* — Austin Rapp & Hardman

(57) ABSTRACT

A wireless communication device configured for selecting a codeword and determining a symbol length for uplink control information is described. The wireless communication device includes a processor and instructions stored in memory. The wireless communication device establishes communication with a base station, receives downlink control information from the base station and receives base station information. The wireless communication device generates uplink control information based on the base station information. The wireless communication device also determines a number of symbols for the uplink control information for a plurality of layers and sends the uplink control information.

20 Claims, 14 Drawing Sheets

(51) Int. Cl.
*H04W 48/16* (2009.01)
*H04W 76/02* (2009.01)
*H04L 5/00* (2006.01)

(56) References Cited

U.S. PATENT DOCUMENTS

| | | |
|---|---|---|
| 2009/0097466 A1 | 4/2009 | Lee et al. |
| 2009/0196366 A1 | 8/2009 | Shen et al. |
| 2009/0199066 A1 | 8/2009 | Kim et al. |
| 2009/0232070 A1 | 9/2009 | Muharemovic et al. |
| 2009/0232101 A1 | 9/2009 | Papasakellariou et al. |
| 2009/0296644 A1 | 12/2009 | Cheon et al. |
| 2010/0034152 A1 | 2/2010 | Imamura |
| 2010/0039953 A1 | 2/2010 | Zhang |
| 2010/0054203 A1 | 3/2010 | Damnjanovic et al. |
| 2010/0115358 A1 | 5/2010 | Kotecha et al. |
| 2010/0142365 A1 | 6/2010 | Richardson et al. |
| 2010/0239040 A1 | 9/2010 | Beluri et al. |
| 2011/0255619 A1 | 10/2011 | Nam et al. |

FOREIGN PATENT DOCUMENTS

| | | |
|---|---|---|
| JP | 2010508679 | 3/2010 |
| WO | 2010025249 | 3/2010 |

OTHER PUBLICATIONS

Ericsson, ST-Ericsson, "Design Principles for UCI on PUSCH," R1-102631, May 10, 2010.
Catt, "Discussion on UCI Transmission in PUSCH," R1-102660, May 10, 2010.
LG Electronics, "Consideration on UCI and PUSCH Data Multiplexing Scheme in Multi-layer PUSCH Transmission," R1-102728, May 10, 2010.
Qualcomm Incorporated, "UCI Multiplexing for SU-MIMO Transmission," R1-102762, May 10, 2010.
Alcatel-Lucent Shanghai Bell, Alcatel-Lucent, "UCI Multiplexing on PUSCH in Case of SU-MIMO," R1-102795, May 10, 2010.
Texas Instruments, "Data and Control Multiplexing for UL Multi-Antenna Transmission," R1-102827, May 10, 2010.
Panasonic, "UCI Multiplexing on PUSCH with MIMO Transmission," R1-102876, May 10, 2010.
ZTE, "UCI Multiplexing on PUSCH with MIMO Transmission," R1-102910, May 10, 2010.
Nokia Siemens Networks, Nokia, "Performance Evaluation of UCI Multiplexing Schemes on PUSCH in Case of SU-MIMO," R1-102962, May 10, 2010.
Samsung, "Further Discussion on Data and Control Multiplexing in UL MIMO Transmissions," R1-103037, May 10, 2010.
Huawei, "Comparison of Multiplexing Schemes of Control and Data in Multi-layer PUSCH Transmission," R1-103111, May 10, 2010.
Motorola, "UCI Multiplexing on PUSCH in UL-MIMO Transmission," R1-103180, May 10, 2010.
MCC Support, "Draft Report of 3GPP TSG RAN WG1 #61 v0.1.0," R1-10xxxx, Jun. 28, 2010.
3GPP TS 36.211 V9.0.0, "Evolved Universal Terrestrial Radio Access (E-UTRA); Physical Channels and Modulation (Release 9)," Dec. 1, 2009.
3GPP TS 36.212 V9.0.0, "Evolved Universal Terrestrial Radio Access (E-UTRA); Multiplexing and Channel Coding (Release 9)," Dec. 1, 2009.
3GPP TS 36.213 V8.6.0, "Evolved Universal Terrestrial Radio Access (E-UTRA) Physical layer procedures (Release 8)," Mar. 1, 2009.
International Search Report issued for International Patent Application No. PCT/JP2011/064333 on Sep. 27, 2011.
Office Action issued for U.S. Appl. No. 12/819,170 on Jun. 20, 2012.
Office Action issued for U.S. Appl. No. 12/819,170 on Jan. 28, 2013.
Office Action issued for U.S. Appl. No. 12/819,170 on Aug. 15, 2013.
Advisory Action issued for U.S. Appl. No. 12/819,170 on Nov. 18, 2013.
Office Action issued for U.S. Appl. tion No. 12/819,170 on Mar. 20, 2014.
Notice of Allowance issued for U.S. Appl. No. 12/819,170 on Nov. 10, 2014.
Nokia Siemens Networks, Nokia, "UCI Transmission on PUSCH with SU-MIMO," 3GPP TSG RAN WG1 Meeting #60bis, R1-101905, Apr. 12, 2010.

* cited by examiner

SELECTING A CODEWORD AND DETERMINING A SYMBOL LENGTH FOR UPLINK CONTROL INFORMATION

CROSS-REFERENCE TO RELATED APPLICATION

This application is a continuation of U.S. patent application Ser. No. 12/819,170, filed Jun. 18, 2010.

TECHNICAL FIELD

The present disclosure relates generally to communication systems. More specifically, the present disclosure relates to selecting a codeword and determining a symbol length for uplink control information.

BACKGROUND

Wireless communication devices have become smaller and more powerful in order to meet consumer needs and to improve portability and convenience. Consumers have become dependent upon wireless communication devices and have come to expect reliable service, expanded areas of coverage, and increased functionality. A wireless communication system may provide communication for a number of cells, each of which may be serviced by a base station. A base station may be a fixed station that communicates with wireless communication devices.

As wireless communication devices have advanced, improvements in communication speed have been sought. One way to increase communication speed is to allocate more communication resources to the wireless communication device. However, allocating more resources to a wireless communication device may also require the use of more communication overhead, such as control messages. Communication overhead may consume communication resources, which may be limited. As illustrated by this discussion, improved systems and methods for communicating control messages may be beneficial.

DETAILED DESCRIPTION

Figure 1:
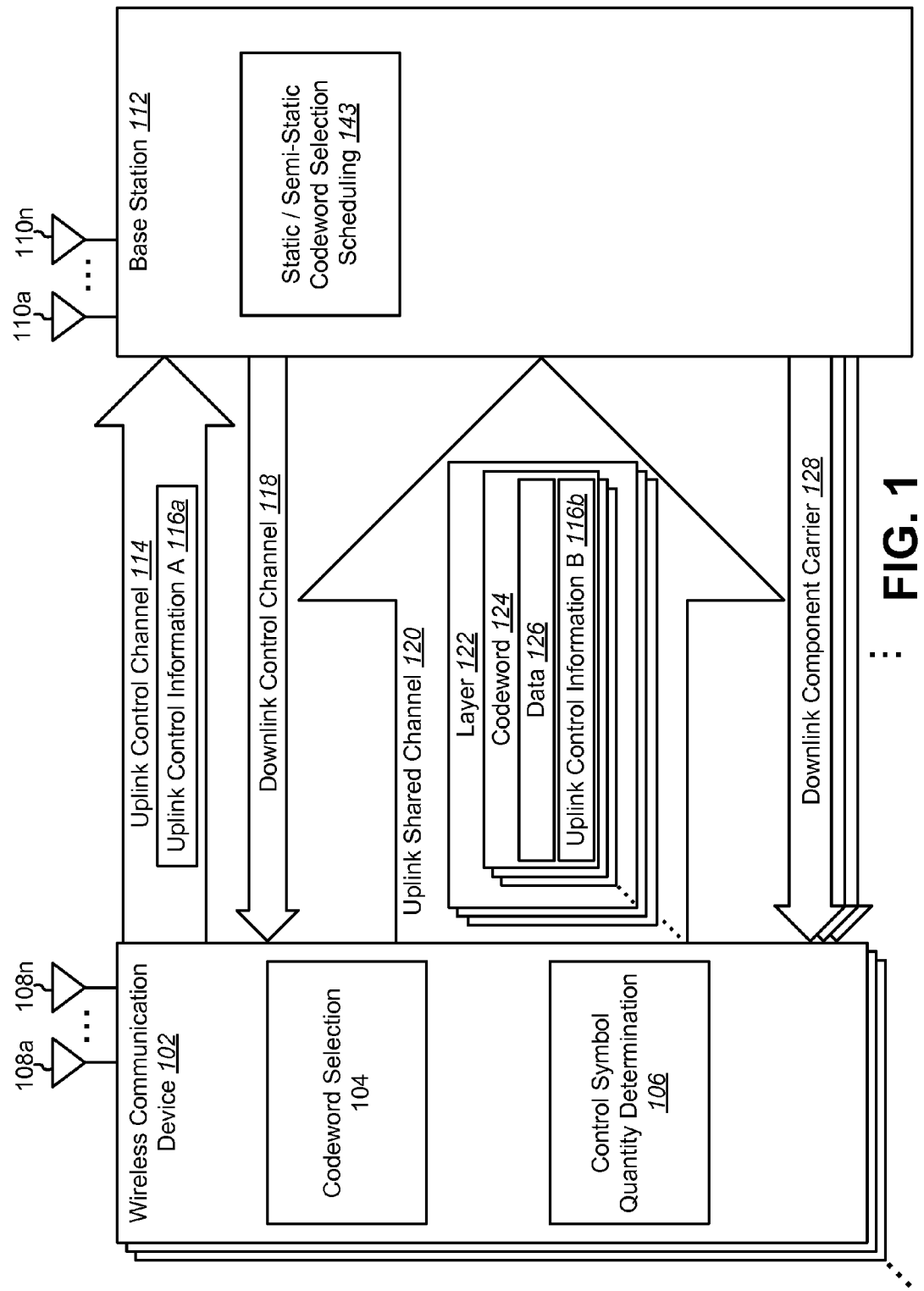
FIG. 1 is a block diagram illustrating one configuration of one or more wireless communication devices in which systems and methods for selecting a codeword and determining a symbol length for uplink control information may be implemented.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (e.g., Release-8 and Release-10). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a user equipment (UE), an access terminal, a subscriber station, a mobile terminal, a remote station, a user terminal, a terminal, a subscriber unit, a mobile device, etc. A wireless communication device may be a cellular phone, a smart phone, a personal digital assistant (PDA), a laptop computer, a netbook, an e-reader, a wireless modem, etc. In 3GPP specifications, a wireless communication device is typically referred to as a user equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved or enhanced Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

A wireless communication device configured for selecting a codeword and determining a symbol length for uplink control information is disclosed. The wireless communication device includes a processor and instructions stored in memory. The wireless communication device establishes communication with a base station, receives downlink control information from the base station and receives base station information. The wireless communication device also generates uplink control information based on the base station information. The wireless communication device also determines a number of symbols for the uplink control information for a plurality of layers and sends the uplink control information.

The number of symbols for the uplink control information may be determined for a plurality of codewords. At least one codeword on the plurality of layers may be aggregated. The number of symbols may be determined based on a worst layer. The number of symbols may be determined based on a proportional allocation of all layers.

A plurality of $\beta_{offset}$ values may be used to determine the number of symbols for the uplink control information. The number of symbols may be determined based on an equation $$Q' = \min\left(\left\lceil \frac{(O+R) \cdot M_{sc}^{PUSCH-initial} \cdot N_{symb}^{PUSCH-initial} \cdot \beta_{offset}^{PUSCH}}{K_r} \right\rceil, M_{sc}^{PUSCH} \cdot N_{symb}^{PUSCH} - \frac{Q_{RI}}{Q_m}\right),$$

where Q' is the number of symbols, O is a number of uplink control information bits, R is a number of Cyclic Redundancy Check (CRC) bits, $M_{sc}^{PUSCH-initial}$ is a number of subcarriers for an initial uplink channel transmission, $N_{symb}^{PUSCH-initial}$ is a number of symbols per subframe for the initial uplink channel transmission, $\beta_{offset}^{PUSCH}$ is $\beta_{offset}$ value for given uplink control information (e.g., 212, $K_r$ is an interleaver size for a codeword r, $M_{sc}^{PUSCH}$ is a number of subcarriers for the current uplink channel transmission, $N_{symb}^{PUSCH}$ is a number of symbols per subframe for the current uplink channel transmission, $Q_{RI}$ is a number of Rank Indicator (RI) bits and $Q_m$ is a modulation order.

The number of symbols may be determined based on an equation $$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right),$$

wherein Q' is the number of symbols, O is a number of uplink control information bits, $M_{sc}^{PUSCH-initial}$ is a number of subcarriers for an initial uplink channel transmission, $N_{symb}^{PUSCH-initial}$ is a number of symbols per subframe for the initial uplink channel transmission, $\beta_{offset}^{PUSCH}$ is $\beta_{offset}$ value for uplink control information, $K_r$ is an interleaver size for a codeword r, C is a number of a codewords and $M_{sc}^{PUSCH}$ is a number of subcarriers for the current uplink channel transmission.

The number of symbols may be determined based on an equation $$Q'_i = \min\left(\left\lceil \frac{O \cdot M_{sc}^{PUSCH-initial} \cdot N_{symb}^{PUSCH-initial} \cdot \beta_{offset}^{PUSCH}}{(K_{rj}/L_j) \cdot L_{sum}} \right\rceil, 4 \cdot M_{sc}^{PUSCH}\right),$$

wherein $Q'_1$ is a number of symbols for layer i, O is a number of uplink control information bits, $M_{sc}^{PUSCH-initial}$ is a number of subcarriers for an initial uplink channel transmission, $N_{symb}^{PUSCH-initial}$ is a number of symbols per subframe for the initial uplink channel transmission, $\beta_{offset}^{PUSCH}$ is $\beta_{offset}$ value or uplink control information, $K_{rj}$ is an interleaver size of a $j^{th}$ codeword, $L_j$ is a number of layers of a codeword, $L_{sum}$ is a total number of layers and $$L_{sum} = \sum_{j=0}^{C-1} L_j$$

and $M_{sc}^{PUSCH}$ is a number of subcarriers for the current uplink channel transmission. The number of symbols may be determined based on the equation $$Q' = \max(Q'_i) i=1, \ldots L_{sum}.$$

The number of symbols may be determined for at least one Acknowledgement and Negative Acknowledgement (ACK/NACK) message. The number of symbols may be determined for at least one Rank Indicator (RI) message.

The wireless communication device may also select a codeword from a plurality of codewords for the uplink control information. Selecting a codeword may be based on a Modulation and Coding Scheme (MCS) setting. Selecting a codeword may be based on a Hybrid Automatic Repeat Request (HARQ) status. The codeword may be selected for at least one CQI/PMI message. The codeword may be selected statically.

A method for selecting a codeword and determining a symbol length for uplink control information is also disclosed. The method includes establishing communication with a base station, receiving downlink control information from the base station and receiving base station information. The method also includes generating, on a wireless communication device, uplink control information based on the base station information. The method also includes determining, on the wireless communication device, a number of symbols for the uplink control information for a plurality of layers and sending the uplink control information.

Uplink Control Information (UCI) is feedback from a UE to an eNB that may be used to indicate the channel condition and acknowledge downlink transmissions, etc. For example, UCI may include Hybrid Automatic Repeat Request (HARQ) feedback (e.g., Acknowledgement and Negative Acknowledgement, "ACK/NACK" or "A/N"), Channel Quality Indication (CQI), Pre-coding Matrix Indicator (PMI) and Rank Indication (RI), etc. In LTE Release-10, multiple (e.g., up to 5) Downlink (DL) Component Carriers (CCs) may be assigned to a UE. Thus the UCI payload may be much larger than that of a Release-8 system where only one DL CC is used. Due to limited resources, a Physical Uplink Control Channel (PUCCH) may not be able to support full UCI feedback. Therefore, an appropriate UCI multiplexing method with data transmission on a Physical Uplink Shared Channel (PUSCH) may be beneficial.

Furthermore, with LTE Release-10 and beyond, a UE may use multiple antennas for data transmission, thus allowing or enabling Single User Multiple Input and Multiple Output (SU-MIMO). For example, a UE may transmit one Codeword (CW) on multiple layers or transmit multiple CWs on multiple layers, each on a different layer. A layer defines a transmit antenna port by multiplexing one or more Codewords (CWs) on one or more layers.

Uplink Control Information (UCI) may be Time Division Multiplexed (TDM) on a PUSCH with SU-MIMO. In one configuration, for both single component carrier (CC) and multiple CCs, HARQ-ACK and RI may be replicated across all layers of both CWs. Furthermore, the HARQ-ACK and RI may be TDM multiplexed with data such that UCI symbols are time-aligned across all layers. In such a configuration, the number of UCI symbols on each CW and on each layer may be determined.

Additionally or alternatively, CQI and/or PMI may be transmitted on only 1 Codeword (CW). In such a configuration, Release-8 multiplexing and channel interleaving mechanisms may be used or extended. For example, an input to data-control multiplexing $\{q_0, q_1, q_2, q_3, \ldots, q_{Q_{CQI}-1}, f_0, f_1, f_2, f_3, \ldots, f_{G-1}\}$ may be grouped into column vectors $\underline{g}_0, \underline{g}_1, \underline{g}_2, \underline{g}_3, \ldots, \underline{g}_{H'-1}$ of length $Q_m*L$, where $Q_m$ is a modulation order (e.g., 2 for QPSK, 4 for 16QAM and 6 for 64QAM, etc.) and L is the number of layers 222 (e.g., 1, 2, etc.) that the CW is mapped onto. $q_0, q_1, q_2, q_3, \ldots, q_{Q_{CQI}-1}$ is the coded CQI/PMI output with the number of bits $Q_{CQI}$ and $f_0, f_1, f_2, f_3, \ldots,$ is G bits of coded data. The variables $\underline{g}_0, \underline{g}_1, \underline{g}_2, \underline{g}_3, \ldots, \underline{g}_{H'-1}$ are column vectors of bit sequences of CQI/PMI multiplexed with data, each column vector is of length $Q_m*L$ (each column vector converts to symbols of modulation order $Q_m$ across L layers, i.e., $Q_m*L$ per vector length). H' is the number of column vectors, which should be equal to the number of resource elements (besides reference symbols) of the Physical Uplink Shared Channel (PUSCH). Time alignment or realignment may be enabled across 2 or more layers (e.g., L=2). In one configuration of UCI symbol-level layer mapping, UCI symbols may be treated the same as (or a part of) data. In such a configuration, a mechanism for CW selection may be used.

The systems and methods disclosed herein describe how to determine the number of UCI symbols on each CW and on each layer for A/N and/or RI channel interleaving. Furthermore, the systems and methods disclosed herein describe a mechanism for CW selection for CQI/PMI multiplexing.

In LTE and LTE-A (and possibly other wireless communication systems), the control message may be better protected than data information bits using higher redundancy. A parameter called $\beta_{offset}$ is defined to give the relative levels of redundancy for the control messages. Different control messages may have different $\beta_{offset}$ values which are configured by the base station.

The systems and methods disclosed herein may be used to determine the number of UCI symbols on each CW and each layer for A/N and RI mapping. Detail is given below on how to compute the number of symbols with the same or different layer modulations and given $\beta_{offset}$ values.

For CQI/PMI multiplexing, the systems and methods disclosed herein provide a procedure for CW selection when multiple CWs are used in SU-MIMO transmission. Several aspects may be considered including complexity, Modulation and Coding Scheme (MCS) setting and HARQ process. In one configuration, the CW with minimum overhead is selected, thus reducing or minimizing system impact on the transmitted CW due to control multiplexing. In particular, considering the soft combining feature in HARQ, a CW with retransmission may be chosen over a CW with initial transmission.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods. As used herein the term "plurality" may indicate two or more. For example, a plurality of components refers to two or more components.

FIG. 1 is a block diagram illustrating one configuration of one or more wireless communication devices 102 in which systems and methods for selecting a codeword and determining a symbol length for uplink control information may be implemented. The one or more wireless communication devices 102 communicate with a base station 112 using one or more antennas 108a-n. For example, the wireless communication device 102 transmits electromagnetic signals to the base station 112 and receives electromagnetic signals from the base station 112 using the one or more antennas 108a-n. The base station 112 communicates with the one or more wireless communication devices 102 using one or more antennas 110a-n. A User Equipment (UE) pursuant to 3GPP specifications is one example of a wireless communication device 102 and an evolved Node B (eNB) pursuant to 3GPP specifications is one example of a base station 112.

The one or more wireless communication devices 102 and the base station 112 may use multiple channels to communicate with each other. In the configuration illustrated in FIG. 1, a wireless communication device 102 may use an uplink control channel 114 to send uplink control information A 116a to the base station 112. One example of an uplink control channel 114 is a Physical Uplink Control Channel (PUCCH) pursuant to 3GPP specifications. The base station 112 may use a downlink control channel 118 to send downlink control information to the wireless communication device 102. One example of a downlink control channel is a Physical Downlink Control Channel (PDCCH) pursuant to 3GPP specifications.

The one or more wireless communication devices 102 may use an uplink shared channel 120 to communicate with or transmit data 126 to the base station 112. Examples of data 126 include voice data, media data, Internet data, file data, etc. Multiple wireless communication devices 102 may concurrently use the uplink shared channel 120. One example of an uplink shared channel 120 is a Physical Uplink Shared Channel (PUSCH) pursuant to 3GPP specifications.

A wireless communication device 102 may send data 126 using one or mode codewords 124 on one or more layers 122. For example, a layer 122 defines a transmit antenna port for a spatial stream. Multiple layers 122 may be formed by using different weighted combinations of multiple antennas 108a-n, 110a-n on the wireless communication device 102 and/or base station 112.

The base station 112 may use one or more downlink component carriers 128 to send data (e.g., voice data, media data (e.g., video, etc.), Internet data, files, etc.) to the one or more wireless communication devices 102. One or more downlink component carriers 128 may be assigned to a single wireless communication device 102.

The wireless communication device 102 may generate uplink control information 116. For example, the wireless communication device 102 may generate uplink control information 116 (e.g., feedback values) based on data or information received on the downlink control channel 118 and/or one or more downlink component carriers 128. For example, the wireless communication device 102 may generate ACK bits for correctly received data and NACK bits for data that was not correctly received. Other examples of uplink control information 116 include PMI, RI and CQI. PMI may be used for generating or updating a precoding matrix on the base station 112. The Rank Indicator (RI) may be used to define the number of useful transmission layers when spatial multiplexing is used. CQI may provide an indication of channel quality.

The uplink control channel 114 may have limited resources for sending uplink control information A 116a. For example, the uplink control channel 114 may have a certain amount of time, frequency and/or spatial resources allocated to it 114 for sending uplink control information A 116a. The amount of uplink control information 116 may vary. For example, as the base station 112 assigns more downlink component carriers 128 to a wireless communication device 102, the wireless communication device 102 may generate more uplink control information 116. For instance, the wireless communication device 102 may generate more ACK/NACK messages or information as more data is received on the downlink component carriers 128. In some cases, there may not be enough resources (e.g., time resources, frequency resources, spatial resources, etc.) on the uplink control channel 114 to carry all of the uplink control information 116.

Uplink control information B 116b may be sent using the uplink shared channel 120. For example, uplink control information B 116b may be multiplexed with data 126 on one or more code words 124 on one or more layers 122. Using this approach may allow uplink control information B 116b to be sent to the base station 112. For example, uplink control information B 116b may be used in addition or alternatively from uplink control information A 116a.

The one or more wireless communication devices 102 may include a codeword selection module 104 and/or a control symbol quantity determination module 106. The codeword selection module 104 may be a hardware and/or software module used to determine or select a codeword 124 to transmit uplink control information B 116b. In one configuration, for example, CQI and/or PMI messages may only be sent on one codeword 124. The codeword selection module 104 may be used to determine or select a codeword 124 for transmitting the CQI and/or PMI messages (e.g., when multiple codewords 124 are used).

The control symbol quantity determination module 106 may be a hardware and/or software module used to determine a number or length of symbols to be transmitted on each codeword 124 and/or on each layer 122. For example, the control symbol quantity determination module 106 may determine the number of symbols used to transmit uplink control information B 116b.

The base station 112 may include a static/semi-static codeword selection scheduling module 143. The static/semi-static codeword selection may be performed using a Modulation and Coding Scheme (MCS) setting and base station 112 scheduling 143. In this configuration, Modulation and Coding Scheme (MCS) settings may be controlled by the base station 112. Accordingly, the base station 112 may modify the MCS setting and antenna port numbers to allow static or semi-static codeword selection. For example, the base station 112 may set static codeword selection on the first codeword 124 by always setting a higher (or the same) MCS setting on the first antenna port (e.g., the first layer). When the channel condition changes, the base station 112 may switch the antenna port number to maintain a higher (or same) MCS setting for the first codeword 124.

Figure 2:
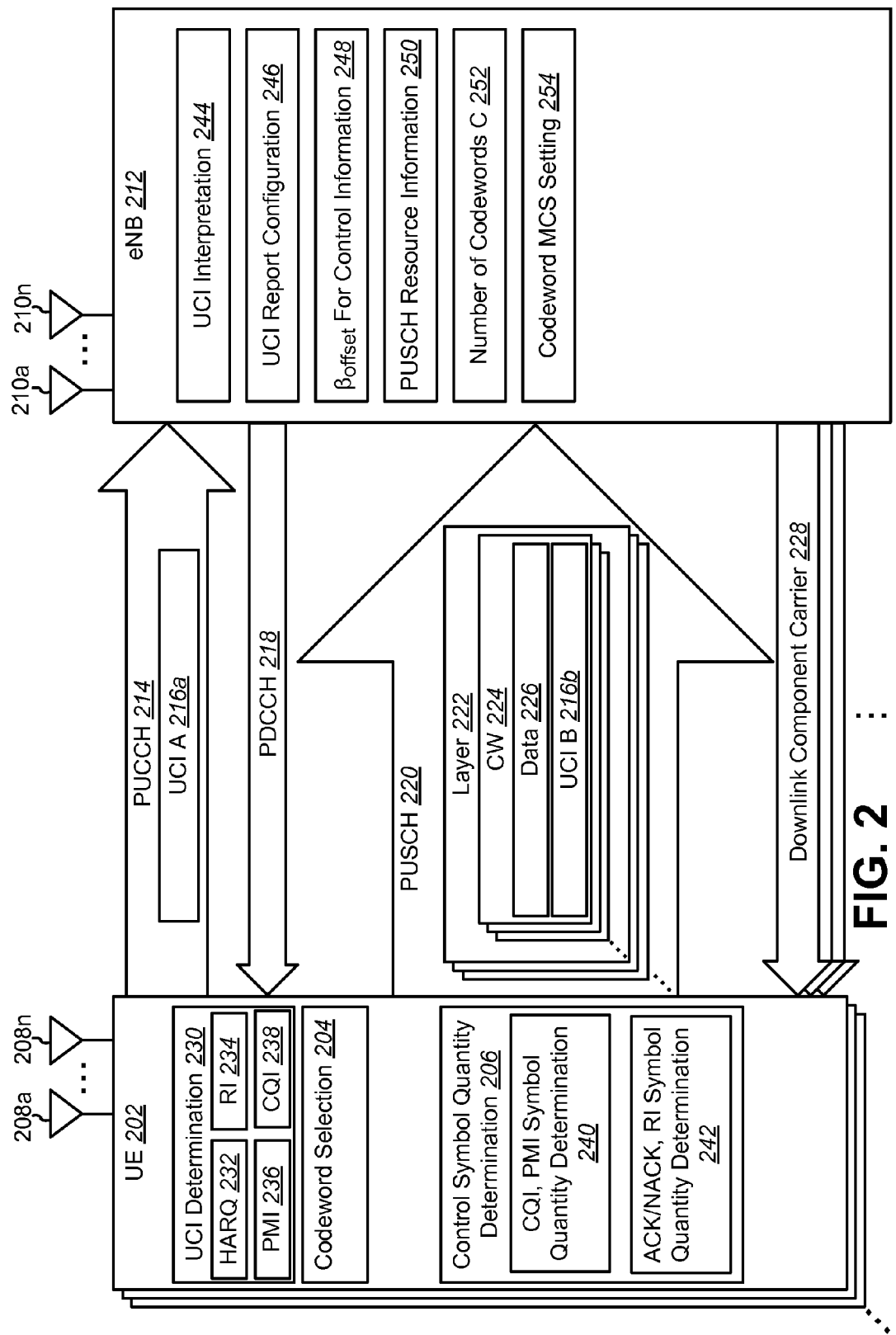
FIG. 2 is a block diagram illustrating a more specific configuration of one or more User Equipments (UEs) in which systems and methods for selecting a codeword and determining a symbol length for uplink control information may be implemented.

FIG. 2 is a block diagram illustrating a more specific configuration of one or more User Equipments (UEs) 202 in which systems and methods for selecting a codeword and determining a symbol length for uplink control information may be implemented. One or more UEs 202 may include an Uplink Control Information (UCI) determination module 230, a codeword selection module 204, a control symbol quantity determination module 206 and one or more antennas 208a-n.

The one or more UEs 202 may communicate with an evolved NodeB (eNB) 212 using one or more antennas 208a-n. The eNB 212 may also communicate with the one or more UEs 202 using one or more antennas 210a-n. The one or more UEs 202 may send data 226 and/or information to the eNB 212 using a PUCCH 214 and/or a PUSCH 220. For example, the UE 202 may send UCI A 216a on the PUCCH 214. Additionally or alternatively, the one or more UEs 202 may send data 226 and/or UCI B 216b on one or more Codewords (CWs) 224 on one or more layers 222 to the eNB 212 using the PUSCH 220. The eNB 212 may send data and/or information to the one or more UEs 202 using a PDCCH 218 and/or one or more downlink component carriers 228.

The UCI determination module 230 on a UE 202 may determine feedback values or messages to be sent to the eNB 212. For example, the UCI determination module 230 may determine or generate one or more HARQ 232 (e.g., A/N) messages, RI messages 234, PMI messages 236 and/or CQI messages 238. The codeword selection module 204 may select a Codeword (CW) 224 on which to send UCI B 216b or part of UCI B 216b. For example, the codeword selection module 204 may select a CW 224 for PMI 236 and/or CQI 238 messages.

The control symbol quantity determination module 206 may include a CQI and/or PMI symbol quantity determination module 240. The CQI and/or PMI symbol quantity determination module 240 may determine the symbol quantity or number of symbols used for CQI 238 and/or PMI 236 messages. The control symbol quantity determination module 206 may also include an ACK/NACK and/or RI symbol quantity determination module 242. The ACK/NACK and/or RI symbol quantity determination module 242 may determine the number of symbols used for HARQ (A/N) messages 232 and/or RI messages 234. In other words, the ACK/NACK and/or RI symbol quantity determination module 242 may determine how many symbols are used to transmit HARQ messages 232 and/or RI messages 234 on the PUSCH 220.

The eNB 212 may include certain data or parameters such as $\beta_{offset}$ for each type of control information 248 (e.g., $\beta_{offset}^{CQI}$ is the $\beta_{offset}$ for CQI/PMI, $\beta_{offset}^{RI}$ is the $\beta_{offset}$ for RI and $\beta_{offset}^{HARQ-ACK}$ is the $\beta_{offset}$ for ACK/NACK), PUSCH Resource Information 250 (such as the subcarrier(s) location and the number of physical resource blocks $N_{PRB}$), a number of codewords C 252 and/or the Modulation and Coding Scheme (MCS) setting 254 for each CW (e.g., MCS Index $I_{MCS}$). These parameters 248, 250, 252, 254 may be determined and/or sent to the UE 202 by the eNB 212. More detail concerning these parameters 248, 250, 252, 254 is given below. The eNB 212 may also include a UCI interpretation module 244 and/or a UCI Report Configuration module 246. The UCI interpretation module 244 may be used by the eNB 212 to interpret UCI B 216b. For example, UCI B 216b may be signaled implicitly. For instance, code word selection 204 may be performed without the UE 202 sending an explicit message to the eNB 212 in order to indicate the CW 224 that was selected for a PMI 236 and/or CQI 238 in UCI B 216b. Thus, the UCI interpretation module 244 may be used to interpret UCI B 216b (e.g., to determine which CW 224 the PMI 236 and/or CQI 238 was sent on). The eNB 212 may also include an UCI Report Configuration module 246. For example, eNB 212 may use the UCI Report Configuration module 246 to send an explicit message to the UE 202 that dictates which CW 224 a PMI 236 or CQI 238 message should be sent on.

For context, an example of Release-8 PUSCH data and control multiplexing is given hereafter. In LTE Release-8 PUSCH data and control multiplexing, the data and control are coded and transmitted separately by puncturing the code data blocks to allocate resources for UCI. The UCI multiplexing includes two steps (see FIG. 3, for example). First, the coded CQI/PMI is multiplexed in front of coded data bits. Second, channel interleaving of coded ACK/NACK and coded RI is performed. The coded A/N and coded RI are inserted to given column sets of symbols in a sub-frame. A $\beta_{offset}$ is defined to vary the error protection given on the control information relative to that given on the data based on channel characteristics and received data as measured at the base station (eNB). Accordingly, $\beta$ times the resources is allocated to each control bit compared with each data information bit. The control redundancy is provided by a simple repetition of the coded control bits into the required coded symbols. In one configuration, the default $\beta_{offset}$ is 20 times for A/N and RI and 6.25 times for CQI.

When a UE 202 transmits HARQ-ACK bits or rank indicator (RI) bits, it may determine the number of coded symbols Q' for HARQ-ACK or rank indicator (RI) as illustrated in Equation (1).

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right), \quad (1)$$

In Equation (1), O is the number of ACK/NACK bits or rank indicator (RI) bits, $M_{sc}^{PUSCH}$ (which may be computed from PUSCH Resource Information 250) is the scheduled bandwidth for PUSCH transmission in the current sub-frame for the transport block expressed as a number of subcarriers. $M_{sc}^{PUSCH-initial}$ is the number of subcarriers for initial PUSCH transmission for the same transport block. $\beta_{offset}^{PUSCH}$ is a $\beta_{offset}$ value for the ACK/NACK or RI sending on PUSCH 220. C 252 is the number of CWs 224 for this transmission, $K_r$ is a turbo code interleaver size for a CW 224. $K_r$ may be determined by the Modulation and Coding Scheme (MCS) setting 254 and the number of subcarriers (e.g., $N_{PRB}$) may be provided by the PUSCH Resource Information 250. $N_{symb}^{PUSCH-initial}$ is the number of Single Carrier-Frequency Division Multiple Access (SC-FDMA) symbols per subframe for initial PUSCH transmission for the same transport block given by $N_{symb}^{PUSCH-initial} = (2 \cdot (N_{symb}^{UL} - 1) - N_{SRS})$. $N_{SRS}$ is the number of Sound Reference Signals in a slot. $N_{SRS}$ is equal to 1 if the UE is configured to send PUSCH and SRS in the same subframe for an initial transmission or if the PUSCH resource allocation for initial transmission even partially overlaps with the cell specific SRS subframe and bandwidth configuration. Otherwise, $N_{SRS}$ is equal to 0. $N_{symb}^{UL}$ is the number of SC-FDMA symbols per slot. For example, $N_{symb}^{UL}$ is equal to 7 with a normal cyclic prefix and 6 for an extended cyclic prefix. $M_{sc}^{PUSCH}$ is a number of subcarriers for the current uplink channel transmission.

$M_{sc}^{PUSCH-initial}$, the number of CWs C 252 and turbo interleaver size K may be obtained from the initial PDCCH for the same transport block. If there is no initial PDCCH with DCI format 0 for the same transport block, $M_{sc}^{PUSCH-initial}$, the number of CWs C 252 and K may be determined from the most recent semi-persistent scheduling assignment PDCCH, when the initial PUSCH for the same transport block is semi-persistently scheduled or the random access response grant for the same transport block, when the PUSCH is initiated by a random access response grant.

For HARQ-ACK information $Q_{ACK} = Q_m \cdot Q'$ and $\beta_{offset}^{PUSCH} = \beta_{offset}^{HARQ-ACK}$. $\beta_{offset}^{HARQ-ACK}$ may be determined according to 3GPP specifications and configured by the eNB 212 with a UCI Report Configuration 246. For RI information $Q_{RI} = Q_m \cdot Q'$ and $\beta_{offset}^{PUSCH} = \beta_{offset}^{RI}$. $\beta_{offset}^{RI}$ may be determined according to 3GPP specifications and configured by the eNB 212 with a UCI Report Configuration 246. $Q_{ACK}$ and $Q_{RI}$ are the number of bits of coded A/N and coded RI, respectively. $Q_{ACK}'$ and $Q_{RI}'$ are the number of symbols of coded A/N and coded RI, respectively, each symbol with a modulation order of $Q_m$. $Q_m$ may be determined by the PUSCH resource information 250 and codeword MCS setting 254.

When the UE 202 transmits channel quality control (CQI) and PMI information bits, it may determine the number of coded symbols Q' for channel quality information as illustrated in Equation (2).

$$Q' = \min\left(\left\lceil \frac{(O+R) \cdot M_{sc}^{PUSCH-initial} \cdot \beta_{offset}^{PUSCH}}{\sum_{r=0}^{C-1} K_r} \right\rceil, 4 \cdot M_{sc}^{PUSCH} \cdot N_{symb}^{PUSCH} - \frac{Q_{RI}}{Q_m}\right) \quad (2)$$

In Equation (2), R is the number of Cyclic Redundancy Check (CRC) bits given by $$R = \begin{cases} 0 & O \leq 11 \\ 8 & \text{otherwise} \end{cases} \cdot Q_{CQI} = Q_m \cdot Q' \text{ and}$$

$$\beta_{offset}^{PUSCH} = \beta_{offset}^{CQI} \cdot \beta_{offset}^{CQI}$$

may be determined according to 3GPP specifications and configured by the eNB 212 with UCI Report Configuration 246. $M_{sc}^{PUSCH}$ is a number of subcarriers for the current uplink channel transmission, $N_{symb}^{PUSCH}$ is a number of symbols per subframe for the current uplink channel transmission. $Q_{RI}$ is a number of Rank Indicator (RI) bits and $Q_m$ is a modulation order. In general, Q may denote a number of bits and may Q' may denote a number of symbols such that $Q = Q_m \cdot Q'$. If an RI is not transmitted, then $Q_{RI} = 0$.

In LTE-A, a UE 202 may have multiple antennas 208a-n. This may enable or allow Single User-Multiple Input Multiple Output (SU-MIMO) on one or more component carriers (CCs). A UE 202 may transmit one or multiple Codewords (CWs) 224 (e.g., Transport Blocks (TBs)) with each CW 224 on one or multiple layers 222. Uplink Control Information (UCI) may be multiplexed on a PUSCH with SU-MIMO. In one configuration, for both single component carrier (CC) and multiple CCs, HARQ-ACK 232 and RI 234 may be replicated across all layers of both or multiple CWs 224. Furthermore, the HARQ-ACK 232 and RI 234 may be TDM multiplexed with data such that UCI symbols are time-aligned across all layers. In such a configuration, the number of UCI symbols on each CW and on each layer 222 may be determined according to the systems and methods disclosed herein.

Additionally or alternatively, CQI 238 and/or PMI 236 may be transmitted on only 1 Codeword (CW) 224. In such a configuration, Release-8 multiplexing and channel interleaving mechanisms may be used and/or extended. For example, an input to data-control multiplexing $\{q_0, q_1, q_2, q_3, \ldots, q_{Q_{CQI}-1}, f_0, f_1, f_2, f_3, \ldots, f_{G-1}\}$ may be grouped into column vectors $g_0, g_1, g_2, g_3, \ldots, g_{H'-1}$ of length $Q_m \cdot L$, where $Q_m$ is a modulation order (e.g., 2 for QPSK, 4 for 16QAM and 6 for 64QAM, etc.) and L is the number of layers 222 (e.g., 1, 2, etc.) that the CW is mapped onto. Time alignment or realignment may be enabled across 2 or more layers (e.g., L=2). In one configuration of UCI symbol-level layer mapping, UCI symbols may be treated the same as (or a part of) data. In such a configuration, CW selection may be performed according to the systems and methods disclosed herein.

The codeword selection module 204 may provide a mechanism for CW selection. More detail on codeword selection follows. In one configuration, CQI 238 and/or PMI 236 may be multiplexed on one CW 224 in SU-MIMO transmission on PUSCH 220. If the number of CWs 224 is one (e.g., only one CW 224 is used), then no CW selection 204 may be needed or applied. If the number of CWs 224 used is 1 and the number of layers 222 is 1 or 2, the UE may use extended Release-8 multiplexing and channel interleaving mechanisms so that an input to data-control multiplexing $\{q_0, q_1, q_2, q_3, \ldots, q_{Q_{CQI}-1}, f_0, f_1, f_2, f_3, \ldots, f_{G-1}\}$ may be grouped into column vectors $g_0, g_1, g_2, g_3, \ldots, g_{H'-1}$ of length $Q_m*L$, where $Q_m$ is a modulation order (e.g., 2 for QPSK, 4 for 16QAM and 6 for 64QAM, etc.) and L is the number of layers 222 (e.g., 1, 2, etc.) that the CW 224 is mapped onto. Time alignment or realignment may be enabled across 2 or more layers (e.g., L=2).

For CQI 238 and/or PMI 236 multiplexing, the systems and methods disclosed herein provide procedures for CW selection 204 when multiple CWs 224 are used in SU-MIMO transmission. Several factors or aspects may be used including complexity, one or more Modulation and Coding Scheme (MCS) settings and/or HARQ status or process. The systems and methods disclosed herein may be used to select the CW 224 with minimum overhead in different configurations in order to reduce or minimize system impact on the transmitted CW 224 due to control (e.g., UCI B 216b) multiplexing.

CQI 238 and/or PMI 236 messages (e.g., UCI B 216b) may be treated the same as data 226 after multiplexing. Thus, the CW 224 with minimum impact after the CQI 238 and/or PMI 236 multiplexing may be selected for uplink MIMO (e.g., when more than one CW 224 is used). Several factors or aspects may be used to make this selection. These factors or aspects may include system complexity, Modulation and Coding Scheme (MCS) settings and/or HARQ status of the CWs 224.

Selecting a CW 224 statically or semi-statically may simplify the CQI 238 and/or PMI 236 decoding at the receiver (e.g., the eNB 212) since it does not need to dynamically determine which CW 224 is used to carry the information. On the other hand, this may cause unnecessary performance loss if the selected CW 224 has a poor channel condition.

A higher MCS setting may imply a better channel quality, a higher data payload size (e.g., Transport Block Size or TBS) and/or a higher order of modulation ($Q_m$). Thus, a smaller number of symbols may be required on a layer 222 with a higher MCS setting to satisfy the same $\beta_{offset}$ requirement for a control message and the CW 224 control/data overhead ratio may be reduced or minimized.

With HARQ (e.g., ACK/NACK) 232, the same or a different redundant version of a CW 224 may be transmitted (e.g., retransmitted) if the previous transmission is not successful. Since a previous version may already be available at the receiver (e.g., the eNB 212), the receiver may be more likely to decode the CW 224 successfully by soft combining the current transmission. Therefore, allocating or giving up resources on a HARQ retransmission CW 224 for control (e.g., UCI B 216b) multiplexing may cause less impact on the data 226 performance compared with taking away resources from an initial transmission CW 224 (e.g., a CW 224 carrying an initial transmission).

However, taking away resources from a retransmission CW 224 may cause a longer delay for the retransmitted CW 224 if it results in an error again. Furthermore, if the last retransmission of a CW 224 is in error, it may trigger higher layer Automatic Repeat Request (ARQ) (e.g., Radio Link Control (RLC) ARQ), thus causing more overhead. Therefore, the CW 224 with the last HARQ retransmission may be avoided to carry CQI 238 and/or PMI 236 if possible.

The corresponding HARQ feedback from the eNB 212 may be signaled on a Physical Hybrid ARQ Indicator Channel (PHICH) (not shown). In one configuration, the HARQ retransmission may be non-adaptive. In this configuration, the same MCS setting may be used for the CW 224 retransmission. In another configuration, the base station (e.g., eNB 212) may additionally or alternatively use adaptive HARQ transmission, where the new transmission parameters are given by or signaled on the PDCCH 218. For example, the base station (e.g., eNB 212) may allocate fewer resources for a retransmission than for the initial CW 224 transmission. In this case, multiplexing CQI 238 and/or PMI 236 on an adaptive CW 224 retransmission with reduced resources may not be desirable. With adaptive HARQ, the parameters and ACK/NACK from the PDCCH 218 may overwrite the information provided on the PHICH.

In one configuration, if more than one CW (e.g., 2 CWs) 224 is transmitted on uplink, the CQI 238 and/or PMI 236 may be multiplexed on one CW 224 only. Therefore, the systems and methods disclosed herein for CW selection may use one or more factors or aspects (e.g., semi-static or dynamic, MCS status or setting and HARQ process) with different configurations.

In one configuration, CW selection 204 may be based on a Modulation and Coding Scheme (MCS) setting. In this configuration, if CWs 224 have different MCS settings, a CW 224 with a higher MCS setting (which may imply higher TBS and better channel quality) may be selected by the UE 202. If CWs 224 have the same MCS setting, the UE 202 may select a first CW 224, may follow explicit CW selection signaling (e.g., the CW explicitly signaled by the eNB 212 with the UCI Report Configuration 246 may be used or selected) or may explicitly signal the CW selection to the eNB 212.

Another configuration may allow static/semi-static CW 224 selection using an MCS setting and base station (e.g., eNB 212) scheduling. In this configuration, MCS settings may be controlled by the base station 112 (e.g., by the eNB 212 with the UCI Report Configuration 246). Accordingly, the base station may modify the MCS setting and antenna port numbers to allow static or semi-static CW selection. For example, the base station (e.g., eNB 212) may set static CW selection on the first CW 224 by always setting a higher (or the same) MCS setting on the first antenna port. When the channel condition changes, the base station (e.g., eNB 212) may switch the antenna port number to maintain a higher (or same) MCS setting for the first CW 224.

In another configuration, the dynamic CW selection 204 may further use the HARQ process with the MCS setting. This may be further divided into two approaches depending on the configuration.

Another configuration may allow dynamic CW selection using MCS and HARQ preferences of initial transmission. In this configuration, an initial transmission CW 224 (e.g., a CW 224 carrying an initial transmission) may be preferred over a HARQ retransmission (CW 224) because it has more chances to be retransmitted when in error. Similarly, a CW 224 with a smaller number of retransmissions in a HARQ process may be preferred over a CW 224 with a higher number of retransmissions. The CW selection 204 according to this configuration is described as follows.

In this configuration, if the CWs 224 have different MCS settings, the UE 202 may select the CW 224 with a higher MCS setting (which may imply a higher TBS and better channel quality). If the CWs 224 have the same MCS setting, the UE 202 may determine whether they are all initial transmissions. If all of the CWs 224 are initial transmissions, the UE 202 may select the first CW 224, may select a CW 224 following explicit CW selection signaling (e.g., using the CW explicitly signaled by the eNB 212 with a UCI Report Configuration 246) or may explicitly signal the CW selection to the eNB 212. If a CW 224 is (or carries) a HARQ retransmission, and another CW 224 is an initial transmission, the UE 202 may select the initial transmission CW 224. If HARQ feedback is received by the UE 202, the UE 202 may optionally determine whether they are adaptive or non-adaptive retransmissions. If one or more CWs 224 are not non-adaptive (e.g., adaptive) retransmissions, the UE 202 may determine whether they are all adaptive retransmissions. If a CW 224 is a non-adaptive retransmission and another CW 224 is an adaptive retransmission, the UE 202 may compare the resources used for the adaptive retransmission against its initial transmission. If the adaptive retransmission uses less resource than its initial transmission, the UE 202 may avoid selecting this CW 224 and select a CW 224 with non-adaptive retransmission. Otherwise, if the resources used for the adaptive retransmission CW 224 is more than its initial transmission the UE 202 may select this CW 224.

If all of the CWs 224 are adaptive retransmissions, the UE may determine the initial MCS setting of the CWs 224, and select the CW 224 with a higher initial MCS setting. If the initial MCS settings are the same, the UE 202 may compare the number of retransmissions. If all of the CWs 224 are non-adaptive retransmissions, the UE 202 may determine the number of retransmissions of the CWs 224. The UE 202 may compare the number of retransmissions of the CWs 224 and select the CW 224 with a smaller number of retransmissions. If the CWs 224 have the same number of retransmissions, the UE 202 may select the first CW 224, select a CW 224 following explicit CW selection signaling (e.g., using the CW 224 explicitly signaled by the eNB 212 with a UCI Report Configuration 246) or may explicitly signal the CW 224 selection to the eNB 212.

Another configuration may allow dynamic CW 224 selection using MCS and HARQ preferences of retransmission. In this configuration, multiplexing CQI 238 and/or PMI 236 on a retransmission CW 224 may cause less system degradation since there may already be a copy of the CW 224 at the receiver (e.g., eNB 212) and HARQ soft-combining may achieve better performance than the initial transmission only. In this configuration, an HARQ retransmission CW 224 may be preferred over an initial transmission CW 224. Similarly, a CW 224 with a higher number of retransmissions may be preferred over a CW 224 with a lower number of retransmissions. An exception may be given on a last retransmission to reduce or minimize the probability of triggering upper layer retransmissions. This CW selection mechanism configuration is described as follows.

In this configuration, if CWs 224 have different MCS settings, the UE 202 may select a CW 224 with a higher MCS setting (which may imply a higher TBS and better channel quality). If the CWs 224 have the same MCS setting, the UE 202 may determine whether they are all initial transmissions. If all of the CWs 224 are initial transmissions, the UE 202 may select the first CW 224, may select a CW 224 following explicit CW selection signaling (e.g., using the CW 224 explicitly signaled by the eNB 212 with a UCI Report Configuration 246) or may explicitly signal the CW 224 selection to the eNB 212. If a CW 224 is (or carries) a HARQ retransmission, and another CW 224 is an initial transmission, the UE 202 may determine whether this is the last retransmission for the HARQ retransmission CW 224. If it is the last retransmission for the HARQ retransmission CW 224, the UE may (avoid it) and select the initial transmission CW 224 for CQI 238 and/or PMI 236 multiplexing. Otherwise (if it is not the last retransmission), the UE 202 may select the HARQ retransmission CW 224 for multiplexing CQI 238 and/or PMI 236.

If HARQ feedback is received by the UE 202, the UE 202 may determine whether they are adaptive or non-adaptive retransmissions. If one or more CWs 224 are not non-adaptive (e.g., adaptive) retransmissions, the UE 202 may determine whether they are all adaptive retransmissions. If a CW 224 is a non-adaptive retransmission and another CW 224 is an adaptive retransmission, the UE 202 may compare the resources used for the adaptive retransmission against (the resources used for) its initial transmission. If the adaptive retransmission uses fewer resources than the initial transmission, the UE 202 may avoid selecting the adaptive retransmission CW 224 and may select the CW 224 with a non-adaptive retransmission. Otherwise, if the resources used for the adaptive retransmission CW 224 are more than the resources used for the initial transmission, the UE 202 may select the adaptive retransmission CW 224.

If all of the CWs 224 are adaptive retransmissions, the UE 202 may determine the initial MCS setting of the CWs 224 and select a CW 224 with a higher initial MCS setting. If the initial MCS settings of the CWs 224 are the same, the UE 202 may determine the number of retransmissions. If all of the CWs 224 are non-adaptive retransmissions, the UE 202 may determine the number of retransmissions of the CWs 224. The UE 202 may compare the number of retransmissions of the CWs 224. If the CWs 224 have the same number of retransmissions, the UE 202 may select the first CW 224 or select a CW 224 following explicit CW selection signaling (e.g., using the CW explicitly signaled by the eNB 212 with a UCI Report Configuration 246) or may explicitly signal the CW selection to the eNB 212. If the CWs have a different number of retransmissions, the UE 202 may check whether this is the last retransmission for the CW 224 with a higher number of HARQ retransmissions, the UE 202 may avoid it and select the CW 224 with a lower number of retransmissions for CQI 238 and/or PMI 236 multiplexing. Otherwise, the UE 202 may select the CW 224 with a higher number of HARQ retransmissions to multiplex CQI 238 and/or PMI 236.

The UE 202 may use the CQI/PMI symbol quantity determination module 240 to determine the number of CQI/PMI symbols on the selected CW 224. The number of CQI/PMI symbols on the selected CW may follow the Release-8 procedure with an extension of time alignment across multiple layers. For example, the number of symbols Q' on each layer 222 may be determined according to the Release-8 formula as illustrated in Equation (3).

$$Q' = \min\left(\left\lceil \frac{(O+R) \cdot M_{sc}^{PUSCH-initial} \cdot N_{symb}^{PUSCH-initial} \cdot \beta_{offset}^{PUSCH}}{K_r} \right\rceil, M_{sc}^{PUSCH} \cdot N_{symb}^{PUSCH} - \frac{Q_{RI}}{Q_m}\right) \quad (3)$$

In Equation (3), $K_r$ is the turbo interleaver size for the selected CW. $K_r$ may be determined by the Modulation and Coding Scheme (MCS) setting 254 and the number of subcarriers (e.g., $N_{PRB}$) provided by the PUSCH Resource Information 250.

According to the systems and methods disclosed herein, CW selection may be accomplished implicitly. For example, the UE 202 may not explicitly signal (to the eNB 212, for example) which CW 224 is selected to carry the PMI 236 and/or CQI 238, and the eNB 212 may not define the CW selection with the UCI Report Configuration 246. In that case, the base station (e.g., eNB 212) may use the UCI interpretation module 244 to determine which CW 224 has been selected for PMI 236 and/or CQI 238 multiplexing. However, the base station (e.g., eNB 212) may choose any CW for UCI multiplexing by explicit signaling with the UCI Report Configuration 246. For example, the eNB 212 may use the UCI Report Configuration 246 to explicitly signal a CW 224 selection to the UE 202 for PMI 236 and/or CQI 238 multiplexing. When explicit signaling is used, it may override implicit CW selection. The eNB 212 may also use the UCI Report Configuration 246 to set the dynamic CW selection preferences with HARQ status, for example, if the CW 224 with initial transmission or a lower number of retransmissions is preferred, or vice versa.

In one configuration for A/N 232 and RI 234, the UCI symbols (e.g., 216b) may be time-aligned across all layers 222. The number of symbols on each layer 222 may need be determined. In Release-8, for example, there may be only one CW 224 on one layer 222 on the PUSCH 220. Thus, a single $\beta_{offset}$ may be sufficient to define the number of code control bits for A/N and RI. With SU-MIMO, however, multiple CWs 224 and multiple layers 222 may be used. Since the UCI symbols (e.g., UCI B 216b) may be time-aligned across all layers 222, the corresponding $\beta_{offset}$ on each layer 222 may be different. If the same $\beta_{offset}$ is applied on each layer 222, the time alignment may not be guaranteed. Furthermore, using time alignment with $\beta_{offset}$ on the best or worst layer, control (e.g., UCI B 216b) may be under-protected or over-protected, respectively. Thus, the $\beta_{offset}$ in the SU-MIMO case may be defined as the sum of the redundancy over all layers 222.

One configuration for determining the number of symbols on each layer 222 is described as follows. In this configuration, A/N 232 and RI 234 are time-aligned across all layers 222, which may be analogous to a rank-1 transmission. One approach is to extend the Release-8 procedure by treating all CWs 224 on all layers 222 as aggregated data. This is illustrated in Equation (4).

$$Q' = \min\left(\left\lceil\frac{O \cdot M_{sc}^{PUSCH-initial} \cdot N_{symb}^{PUSCH-initial} \cdot \beta_{offset}^{PUSCH}}{\sum_{r=0}^{C-1} K_r}\right\rceil, 4 \cdot M_{sc}^{PUSCH}\right) \quad (4)$$

In Equation (4), O is the number of ACK/NACK 232 bits or rank indicator (RI) 234 bits, C 252 is the number of CWs 224, $K_r$ is the turbo code interleaver size for a CW 224. $K_r$ may be decided by the Modulation and Coding Scheme (MCS) setting 254 and the number of subcarriers (e.g., $N_{PRB}$) provided by the PUSCH Resource Information 250. The sum of $K_r$ for all the CWs 224 may be used in the denominator.

Equation (4) may be alternatively explained as follows. A/N 232 and RI 234 may be interleaved on all layers 222. Accordingly, a $\beta_{offset}$ value may be calculated for each layer 222. The sum of the $\beta_{offset}$ on all layers 222 should be equal to the desired $\beta_{offset}$ value 248.

For example, assuming Q' symbols on each layer 222, the $\beta_{offset}$ for each layer 222 may be given as illustrated in Equation (5).

$$\beta_{offset\ i}^{PUSCH} = \frac{Q'(Kr_j/L_j)}{O \cdot M_{sc}^{PUSCH-initial} \cdot N_{symb}^{PUSCH-initial}} \quad (5)$$

In Equation (5), layer i 222 is mapped to the $j^{th}$ CW 224. $Kr_j$ is the interleaver size of $j^{th}$ CW 224 for j=0, ..., C−1, and $L_j$ is the number of layers 222 of the $C^{th}$ CW 224. The total $\beta_{offset}$ may be expressed as illustrated in Equation (6).

$$\begin{aligned}\beta_{offset}^{PUSCH} &= \sum_{i=1}^{L_{sum}} \beta_{offset\ i}^{PUSCH} \\ &= \sum_{i=1}^{L_{sum}} \frac{Q'(Kr_j/L_j)}{O \cdot M_{sc}^{PUSCH-initial} \cdot N_{symb}^{PUSCH-initial}} \\ &= \frac{Q'\sum_{r=0}^{C-1} Kr}{O \cdot M_{sc}^{PUSCH-initial} \cdot N_{symb}^{PUSCH-initial}}\end{aligned} \quad (6)$$

In Equation (6), $L_{sum}$ is the total number of layers 222 for transmission, where $$L_{sum} = \sum_{i=0}^{C-1} L_i.$$

Thus, given the desired $\beta_{offset}$ value, the desired Q' can be obtained as illustrated in Equation (7).

$$Q' = \frac{O \cdot M_{sc}^{PUSCH-initial} \cdot N_{symb}^{PUSCH-initial} \cdot \beta_{offset}^{PUSCH}}{\sum_{r=0}^{C-1} K_r} \quad (7)$$

The UCI (e.g., UCI B 216b) may be mapped to an integer number of symbols. Thus, the same result is obtained. That is, $$Q' = \min\left(\left\lceil\frac{O \cdot M_{sc}^{PUSCH-initial} \cdot N_{symb}^{PUSCH-initial} \cdot \beta_{offset}^{PUSCH}}{\sum_{r=0}^{C-1} K_r}\right\rceil, 4 \cdot M_{sc}^{PUSCH}\right).$$

In this configuration, $\beta_{offset}$ is proportionally distributed across layers 222, with lower layer 222/CW 224 $\beta_{offset}$ values on the layer 222/CW 224 with higher MCS settings, for example.

In another configuration, a more conservative approach (which may guarantee control performance, for example) comprises calculating Q' based on the worst layer 222 setting. In this configuration, let the expected $\beta_{offset}$ on a layer be described as $$\beta_{offset}^{PUSCH}\bigg|_{layer} = \frac{\beta_{offset}^{PUSCH}}{L_{sum}}.$$

Then, $Q'_i$ may be determined as illustrated in Equation (8).

$$Q'_i = \frac{O \cdot M_{sc}^{PUSCH-initial} \cdot N_{symb}^{PUSCH-initial} \cdot \beta_{offset}^{PUSCH}\big|_{layer}}{(K_{rj}/L_j)} \quad (8)$$
$$= \frac{O \cdot M_{sc}^{PUSCH-initial} \cdot N_{symb}^{PUSCH-initial} \cdot \beta_{offset}^{PUSCH}}{(K_{rj}/L_j) \cdot L_{sum}}$$

Ceiling into an integer number of symbols and limited by the PUSCH resources,
Equation (9) may be obtained.

$$Q'_i = \min\left(\left\lceil \frac{O \cdot M_{sc}^{PUSCH-initial} \cdot N_{symb}^{PUSCH-initial} \cdot \beta_{offset}^{PUSCH}}{(K_{rj}/L_j) \cdot L_{sum}} \right\rceil, 4 \cdot M_{sc}^{PUSCH}\right) \quad (9)$$

Furthermore, Q' may be determined as illustrated in Equation (10).

$$Q' = \max(Q'_i) i=1, \ldots, L_{sum} \quad (10)$$

This configuration may ensure that the $\beta_{offset}$ is maintained even for the worst codeword 224 and layer 222. On the other hand, it protects the A/N 232 and RI 234 with higher overhead compared with the configuration illustrated in Equations (4)-(7).

Figure 3:
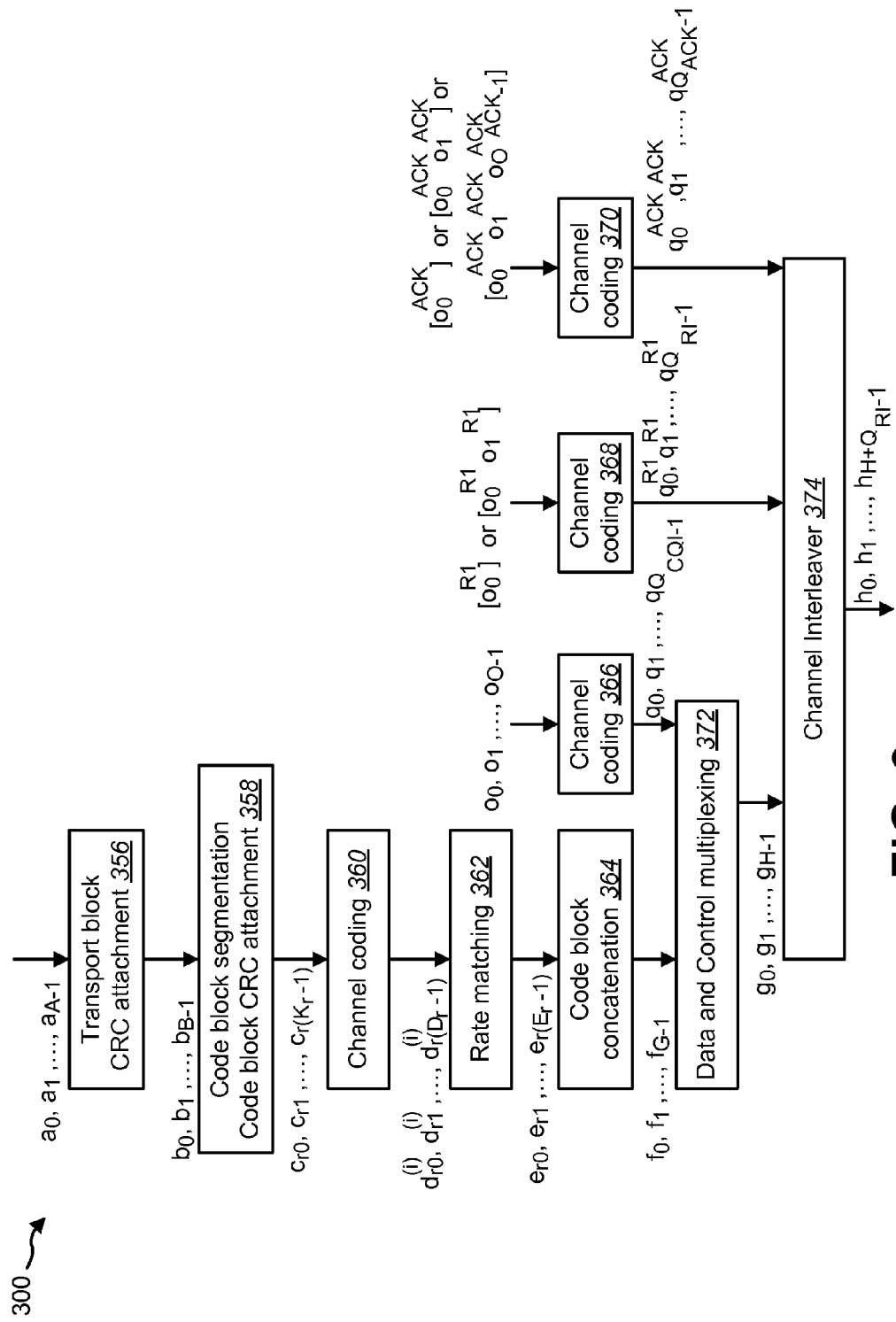
FIG. 3 is a block diagram illustrating one configuration of several information formatting mechanisms that may be used in accordance with the systems and methods disclosed herein.

FIG. 3 is a block diagram illustrating one configuration 300 of several information formatting modules that may be used in accordance with the systems and methods disclosed herein. The transport block CRC attachment module 356 may format information into a transport block and attach CRC information. The code block segmentation/code block CRC attachment module 358 may segment a code block and attach CRC information. This may be input into the channel coding module 360, which may channel code the input. The output of the channel coding module 360 may be input into the rate matching module 362, which may rate match the input into the desired length to fill the PUSCH allocation resource. This may be input into the code block concatenation module 364, which may concatenate the input to form a code block to fill the PUSCH allocation resource. In one configuration, for example, in uplink there may only be one transport block for one antenna port.

Control information may be channel coded by channel coding modules 366, 368, 370. For example, CQI 238 and/or PMI 236 may be channel coded by a channel coding module 366. RI 234 may be channel coded by another channel coding module 368 and ACK/NACK (e.g., HARQ 232) may be channel coded by another channel coding module 370.

According to the systems and method disclosed herein, the coded CQI/PMI 238, 236 is multiplexed in front of coded data bits by a data and control multiplexing module 372. Additionally, channel interleaving of coded ACK/NACK 232 and coded RI 234 is performed by a channel interleaver 374. The coded A/N 232 and coded RI 234 may be inserted to given column sets of symbols in a sub-frame. FIG. 3 illustrates mechanisms that may be applied in accordance with the systems and methods disclosed herein. That is, the systems and methods disclosed herein may describe how to determine the length of coded control messages (e.g., the number of symbols for coded bits of A/N and RI on each layer), which Transport Block (TB) may be used for CQI/PMI multiplexing, and the number of symbols for coded CQI/PMI on each layer of the selected codeword.

According to the systems and method disclosed herein, the number of symbols for the coded CQI/PMI 238 on each layer of a selected codeword and the number of symbols for the coded ACK/NACK 232 and/or coded RI 234 on each layer of all codewords may be decided by the corresponding $\beta_{offset}$ (e.g., $\beta_{offset}^{CQI}$, $\beta_{offset}^{HARQ-ACK}$ and $\beta_{offset}^{RI}$ may be determined for CQI/PMI, A/N and RI, respectively). The $\beta_{offset}$ values may be the same and may be derived the same way as in LTE Release-8, such that the UE may obtain the $\beta_{offset}$ for control information 248 for SU-MIMO, including one codeword on multiple layers and multiple codewords on multiple layers, in a similar way for one codeword on one layer.

Figure 4:
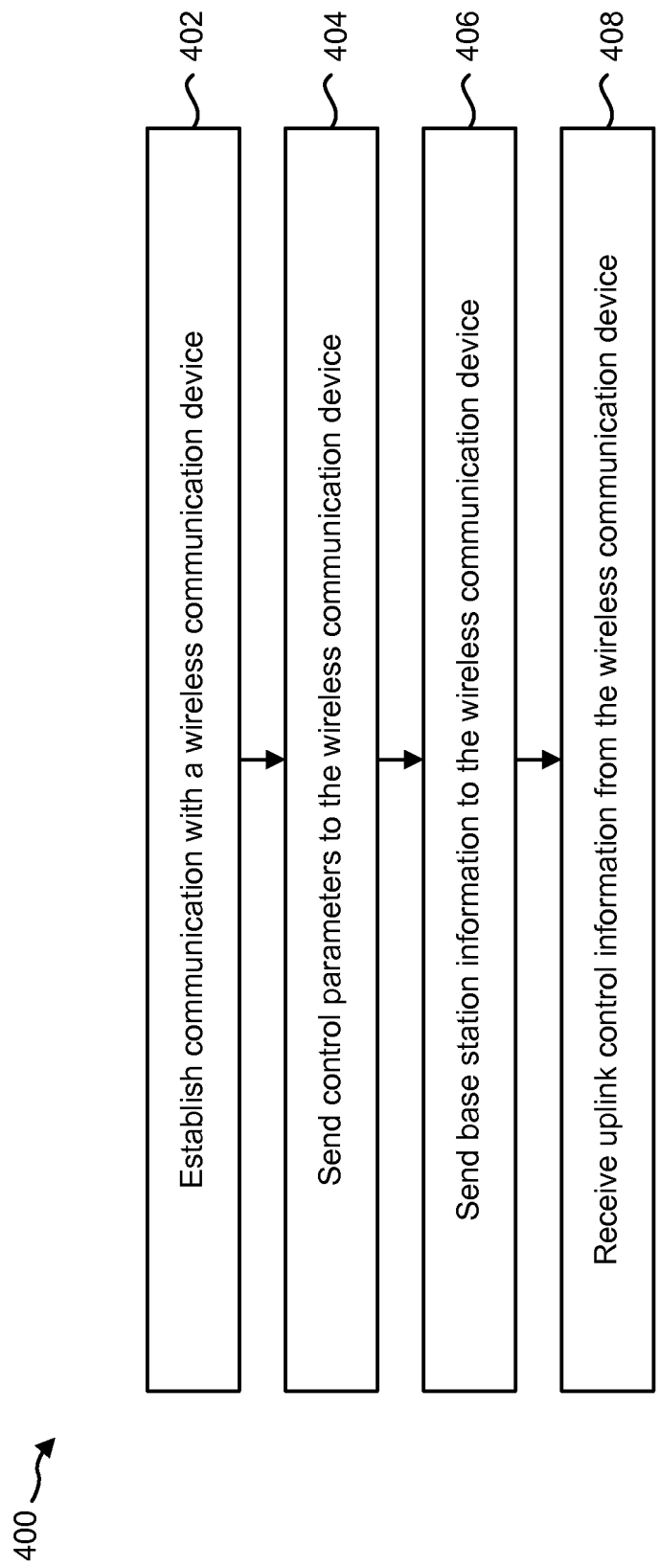
FIG. 4 is a flow diagram illustrating one configuration of a method that may be performed on a base station according to the systems and methods disclosed herein.

FIG. 4 is a flow diagram illustrating one configuration of a method 400 that may be performed on a base station 112 according to the systems and methods disclosed herein. A base station 112 may establish 402 communication with a wireless communication device 102. The base station 112 may send 404 control parameters to the wireless communication device 102. For example, the base station 112 may send one or more $\beta_{offset}$ for Control Information 248 parameters, the number of CWs C 252 (e.g., the number of CWs 224), codeword MCS setting 254 and other parameters, such as PUSCH Resource Information 250 and UCI Report Configuration 246 if necessary. The base station 112 may send 406 base station information to the wireless communication device 102. For example, the base station 112 may send (downlink) data to the wireless communication device 102 (e.g., voice data, media data, file data, etc.). The wireless communication device 102 may use the parameters and/or information (e.g., data) to determine feedback values, such as ACK/NACK 232, RI 234, PMI 236 and/or CQI 238 uplink control information (e.g., UCI B 216b). The wireless communication device 102 may format and send this uplink control information 116b on one or more codewords 124 and/or on one or more layers 222 according to the systems and methods disclosed herein. The base station 112 may receive 408 the uplink control information 116b from the wireless communication device 102. Depending on the configuration, the base station 112 may use the uplink control information 116b for maintaining and/or modifying its 112 communications with the wireless communication device 102. For example, the base station 112 may retransmit data, update a precoder and/or generate control commands, etc. based on the uplink control data 116b.

Figure 5:
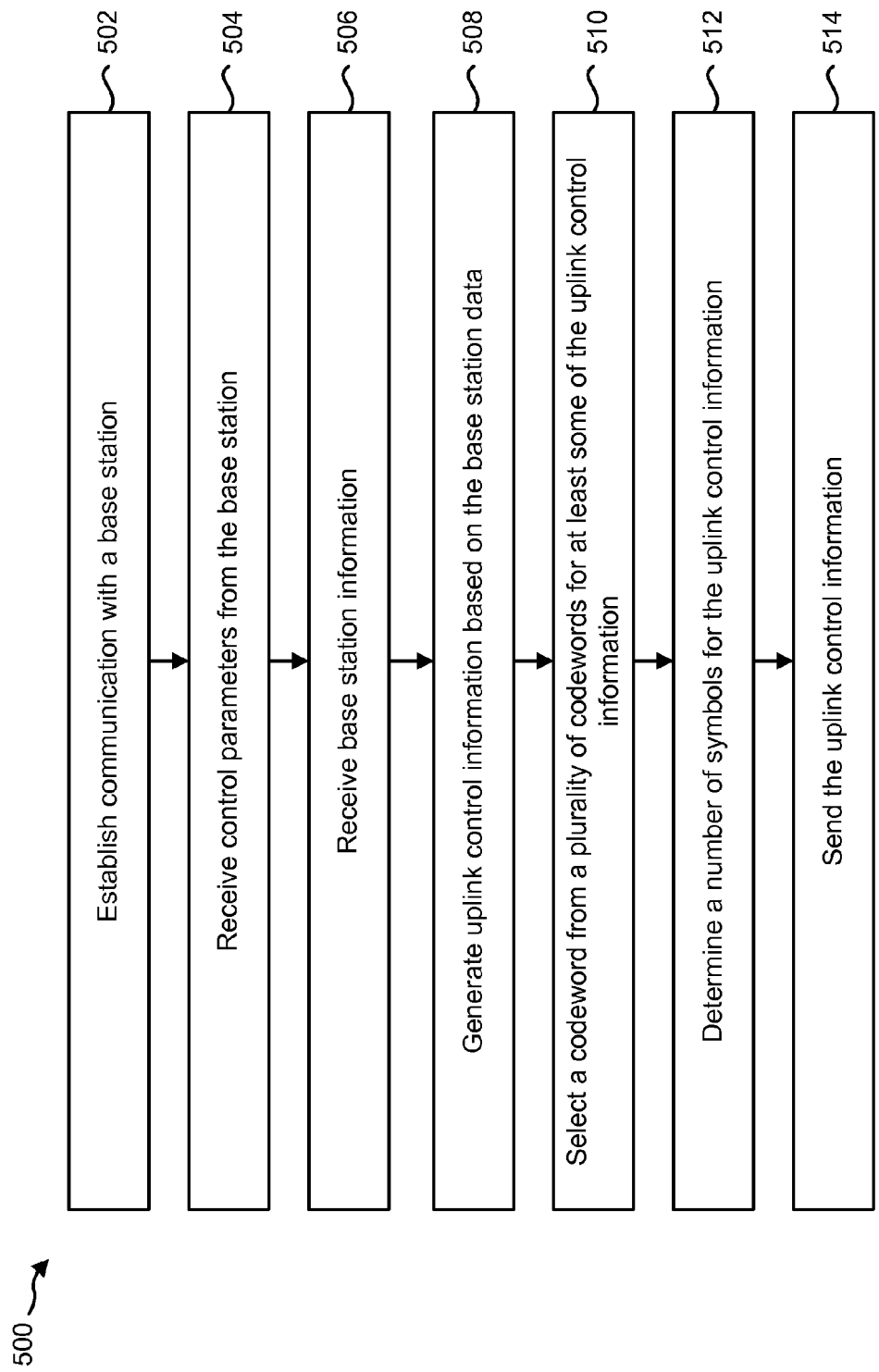
FIG. 5 is a flow diagram illustrating one configuration of a method for selecting a codeword and determining a symbol length for uplink control information.

FIG. 5 is a flow diagram illustrating one configuration of a method 500 for selecting a codeword and determining a symbol length for uplink control information. A wireless communication device 102 may establish 502 communication with a base station 112. For example, a wireless communication device 102 may negotiate with a base station 112 to gain access to base station 112 resources by sending messages to and/or receiving messages from the base station 112. The wireless communication device 102 may receive 504 control parameters from the base station 112. For example, the wireless communication device 102 may receive one or more $\beta_{offset}$ for Control Information 248, the number of CWs C 252 (e.g., the number of CWs 224), Codeword MCS Setting 254 and/or other parameters such as PUSCH Resource Information 250 and UCI Report Configuration 246 if necessary. The wireless communication device 102 may additionally or alternatively receive commands from the base station 112.

The wireless communication device 102 may also receive 506 base station 112 information. For example, the wireless communication device 102 may receive 506 data or messages from the base station 112 on one or more downlink component carriers 128. For instance, the wireless communication device 102 may receive 506 voice data, media data, file data, etc. from the base station 112.

The wireless communication device 102 may generate 508 uplink control information based on the base station 112 information. For example, the wireless communication device 102 may use the UCI Report Configuration 246 to determine if control reporting is required and if not, what control information may be reported. The wireless communication device 102 may use the parameters and/or information (e.g., data) to determine feedback values, such as ACK/NACK 232, RI 234, PMI 236 and/or CQI 238 uplink control information (e.g., UCI B 216b).

The wireless communication device 102 may select a codeword 124 from a plurality of codewords 124 for at least some of the uplink control information. For example, if a plurality of (e.g., two or more) codewords 124 are used, the wireless communication device 102 may select one codeword 124 from the plurality of codewords 124 for CQI and/or PMI multiplexing. More detail regarding selecting 510 a codeword 124 was given above in connection with FIG. 2 and will be given below in connection with FIG. 7.

The wireless communication device 102 may determine 512 a number of symbols for the uplink control information 116b. For example, the wireless communication device 102 may determine 512 a number of symbols (on the one or more codewords 124 and/or layers 122, for example) for CQI 238, PMI 236, ACK/NACK 232, and/or RI 234. More detail regarding determining 512 a number of symbols was given above in connection with FIG. 2 and will be given below in connection with FIG. 8. The wireless communication device 102 may send 514 the uplink control information 116b. For example, the wireless communication device 102 may send 514 the uplink control information according to the codeword selection 510 and/or symbol quantity determination 512.

Figure 6:
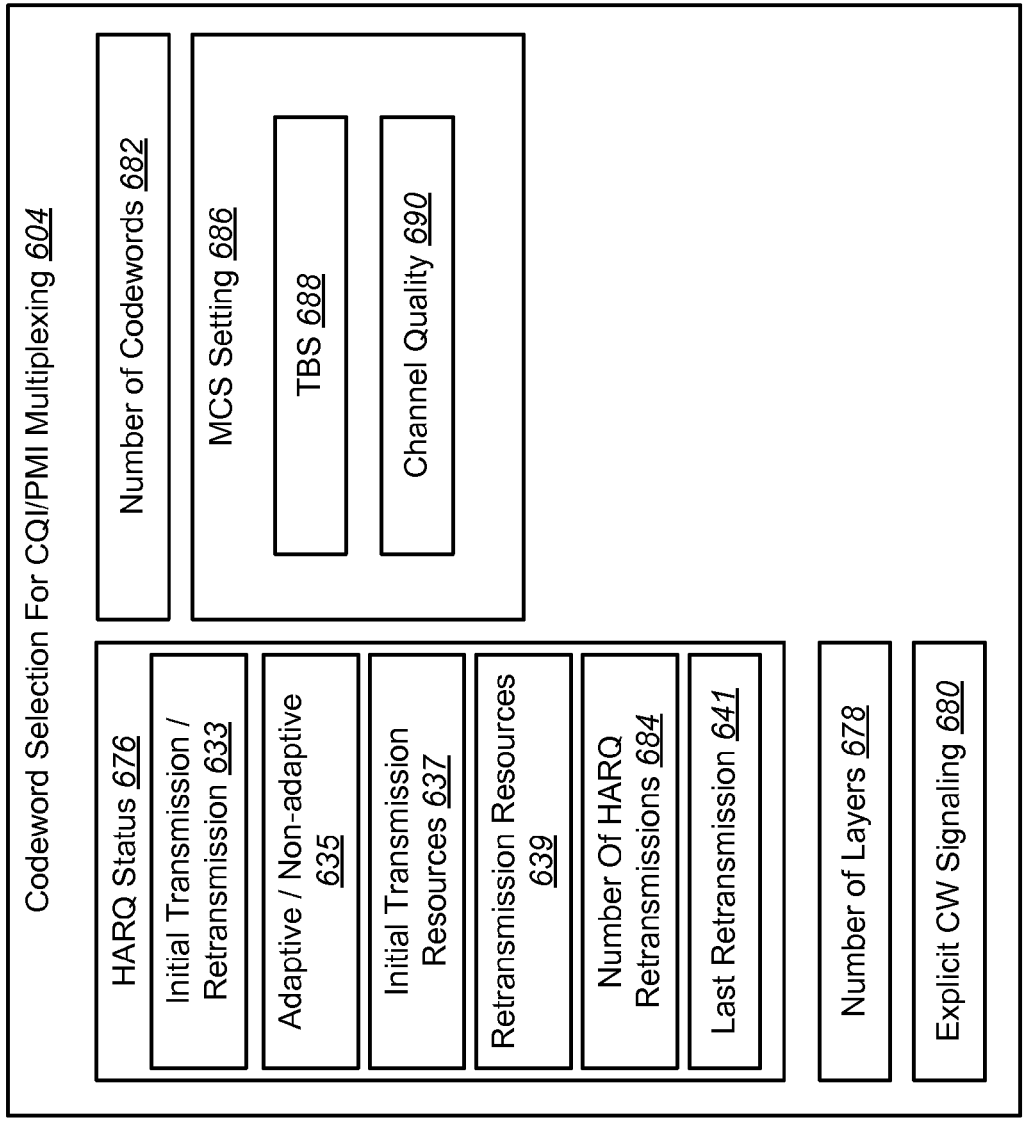
FIG. 6 is a block diagram illustrating one configuration of a codeword selection module for CQI and/or PMI multiplexing.

FIG. 6 is a block diagram illustrating one configuration of a codeword selection module 604 for CQI and/or PMI multiplexing. The codeword selection module 604 may include one or more HARQ statuses 676, a number of layers 678, a number of codewords 682 and/or one or more MCS settings 686. The codeword selection module 604 may also include an explicit CW signaling module 680.

Each of the one or more HARQ statuses 676 may correspond to a codeword 124, for example. Each of the HARQ statuses 676 may include information such as whether the codeword 124 is an initial transmission or a retransmission 633, whether the codeword 124 is using adaptive or non-adaptive retransmission 635 (e.g., if the codeword 124 is a retransmission), the amount of resources used for an initial retransmission 637, the amount of resources used for a subsequent adaptive retransmission 639, the number of HARQ retransmissions 684 and/or whether the codeword 124 is a last retransmission 641.

The number of layers 678 may indicate the number of layers 122 being used by the wireless communication device 102. The number of codewords 682 may indicate the number of codewords being used by the wireless communication device 102. Each of the one or more MCS settings 686 may correspond to a codeword 124. Each MCS setting 686 may indicate (e.g., implicitly or explicitly indicate) information such as a Transport Block Size (TBS) 688 and/or channel quality 690, for example. The TBS 688 may indicate the size of the transport block for a codeword 124. The channel quality 690 may provide an indication of channel quality.

The explicit CW signaling module 680 may allow the wireless communication device 102 to follow explicit CW selection commands for an eNB 212 or explicitly signal a CW selection in certain cases. The codeword selection module 604 for CQI/PMI multiplexing may operate in accordance with the method 700 illustrated in FIGS. 7A-7E as follows.

FIGS. 7A, 7B, 7C, 7D and 7E are flow diagrams illustrating several configurations of a method 700 for selecting a codeword for uplink control information. The codeword selection module 104 on the wireless communication device 102 may be used to select a CW 124 for uplink control information 116b. In one configuration, CQI 238 and/or PMI 236 may be multiplexed on one CW 224 in SU-MIMO transmission on a PUSCH 220. The wireless communication device 102 may determine 702 whether to use CQI/PMI multiplexing. For example, the wireless communication device 102 may determine whether CQI 238 and/or PMI 236 messages cannot be sent on a PUCCH 214 (e.g., the PUCCH's 214 resources are already occupied), whether the eNB 212 has commanded CQI/PMI multiplexing and/or whether CQI/PMI multiplexing would otherwise be beneficial.

If the wireless communication device 102 determines 702 to use CQI/PMI multiplexing, the wireless communication device 102 may determine 704 whether the number of codewords 124 (e.g., CWs 224) used is one or more. For example, the base station 112 (e.g., eNB) may configure communications (e.g., allocate communication resources) for the wireless communication device 102 to use one or more codewords 124 or the wireless communication device 102 may otherwise determine whether one or more codewords 124 may be used (e.g., if sufficient communication resources allow usage of only one or more codewords 124).

Figure 7A:
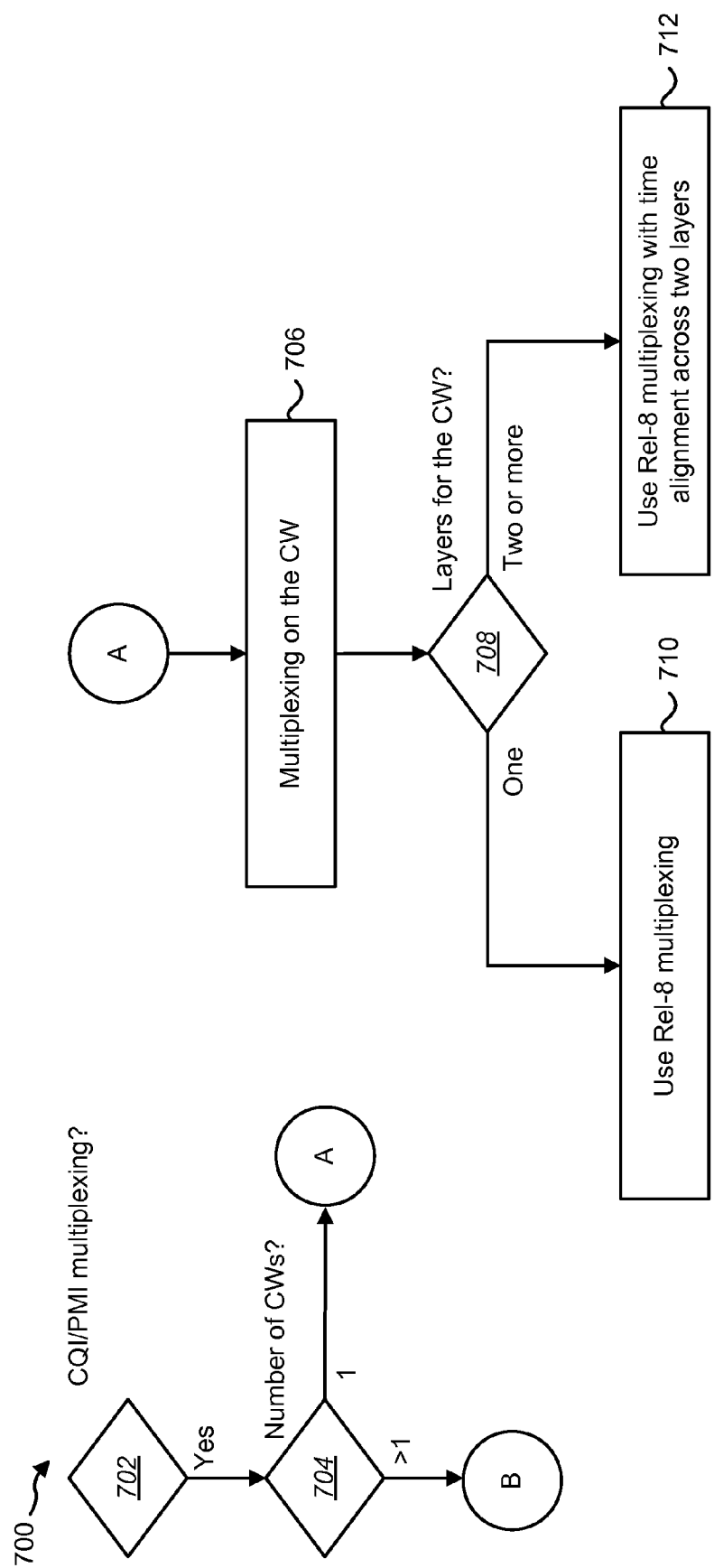
FIGS. 7A, 7B, 7C, 7D and 7E are flow diagrams illustrating several configurations of a method for selecting a codeword for uplink control information.

If the wireless communication device 102 determines 704 that only one codeword 124 (e.g., one CW 224) is used, then no CW selection 204 may be needed or applied. In FIG. 7A, operation may thus continue through connector A (e.g., connectors A, B, C, D used for convenience) to multiplexing 706 on the CW. In other words, if only one codeword 124 is used, then the wireless communication device 102 may multiplex 706 on the single codeword 124.

The wireless communication device 102 may determine 708 whether one or more layers 122 are used. For example, the base station 112 (e.g., eNB) may configure communications (e.g., allocate communication resources) for the wireless communication device 102 to use one or more layers 122 or the wireless communication device 102 may otherwise determine whether one or more layers 122 may be used (e.g., if communication resources allow usage of multiple layers 122).

If the number of codewords 124 used is one and the number of layers 122 is 1 or 2, the wireless communication device 102 may use Release-8 (and/or extended Release-8) multiplexing and channel interleaving mechanisms so that an input to data-control multiplexing $\{q_0, q_1, q_2, q_3, \ldots, q_{Q_{CQI}-1}, f_0, f_1, f_2, f_3, \ldots, f_{G-1}\}$ may be grouped into column vectors $\underline{g}_0, \underline{g}_1, \underline{g}_2, \underline{g}_3, \ldots, \underline{g}_{H'-1}$ of length $Q_m * L$, where $Q_m$ is a modulation order (e.g., 2 for QPSK, 4 for 16QAM and 6 for 64QAM, etc.) and L is the number of layers 222 (e.g., 1, 2, etc.) that the codeword 124 is mapped onto. For example, if the wireless communication device 102 determines 708 that only one layer 122 is used, the wireless communication device may use 710 Release-8 (e.g., "Rel-8") multiplexing. If the wireless communication device 102 determines 708 that more than one layer (e.g., two or more) is used, the wireless communication device may use 712 (e.g., "reuse") Release-8 multiplexing. In this case, time alignment or realignment may be enabled across 2 or more layers (e.g., L=2).

For CQI 238 and/or PMI 236 multiplexing, the systems and methods disclosed herein provide procedures for codeword selection 104 when multiple codewords 124 are used in SU-MIMO transmission. Several factors or aspects may be used including complexity, one or more Modulation and Coding Scheme (MCS) settings and/or HARQ status or process. The systems and methods disclosed herein may be used to select the codeword 124 with reduced or minimum overhead in different configurations in order to reduce or minimize system impact on the transmitted codeword 124 due to control (e.g., uplink control information B 116*b*) multiplexing.

CQI 238 and/or PMI 236 messages (e.g., uplink control information B 116*b*) may be treated the same as data 226 after multiplexing. Thus, the codeword 124 with minimum impact after the CQI 238 and/or PMI 236 multiplexing may be selected for uplink MIMO (e.g., when more than one codeword 124 is used). Several factors or aspects may be used to make this selection. These factors or aspects may include system complexity, Modulation and Coding Scheme (MCS) settings and/or HARQ status of the codewords 124.

Selecting a codeword 124 statically or semi-statically may simplify the CQI 238 and/or PMI 236 decoding at the receiver (e.g., the base station 112 or eNB 212) since it does not need to dynamically determine which codeword 124 is used to carry the information. On the other hand, this may cause unnecessary performance loss if the selected codeword 124 has a poor channel condition.

A higher MCS setting may imply a better channel quality, a higher data payload size (e.g., Transport Block Size or TBS) and/or a higher order of modulation ($Q_m$). Thus, a smaller number of symbols may be required on a layer 122 with a higher MCS setting to satisfy the same $\beta_{offset}$ requirement for a control message and the codeword 124 control/data overhead ratio may be reduced or minimized.

With HARQ (e.g., ACK/NACK) 232, the same or a different redundant version of a codeword 124 may be transmitted (e.g., retransmitted) if the previous transmission is not successful. Since a previous version may already be available at the receiver (e.g., the base station 112 or eNB 212), the receiver may be more likely to decode the codeword 124 successfully by soft combining the current transmission. Therefore, allocating or giving up resources on a HARQ retransmission codeword 124 for control (e.g., UCI B 216*b*) multiplexing may cause less impact on the data 226 performance compared with taking away resources from an initial transmission codeword 124 (e.g., a codeword 124 carrying an initial transmission).

However, taking away resources from a retransmission codeword 124 may cause a longer delay for the retransmitted codeword 124 if it results in an error again. Furthermore, if the last retransmission of a codeword 124 is in error, it may trigger higher layer Automatic Repeat Request (ARQ) (e.g., Radio Link Control (RLC) ARQ), thus causing more overhead. Therefore, the codeword 124 with the last HARQ retransmission may be avoided to carry CQI 238 and/or PMI 236 if possible.

In one configuration, the HARQ retransmission may be non-adaptive. In this configuration, the same MCS setting may be used for the codeword 124 retransmission and the corresponding HARQ feedback may be signaled on a Physical Hybrid ARQ Indicator Channel (PHICH). In another configuration, the base station (e.g., eNB 212) may additionally or alternatively use adaptive HARQ transmission, where the new transmission parameters and HARQ feedback are given by or signaled on the PDCCH 218. For example, the base station (e.g., eNB 212) may allocate fewer resources for a retransmission than for the initial codeword 124 transmission. In this case, multiplexing CQI 238 and/or PMI 236 on an adaptive codeword 124 retransmission with reduced resources may not be desirable.

In one configuration, if more than one codeword (e.g., 2 codewords) 224 is transmitted on uplink, the CQI 238 and/or PMI 236 may be multiplexed on one codeword 124 only. Therefore, the systems and methods disclosed herein for codeword selection may use one or more factors or aspects (e.g., semi-static or dynamic, MCS status or setting and HARQ process) with different configurations.

Figure 7B:
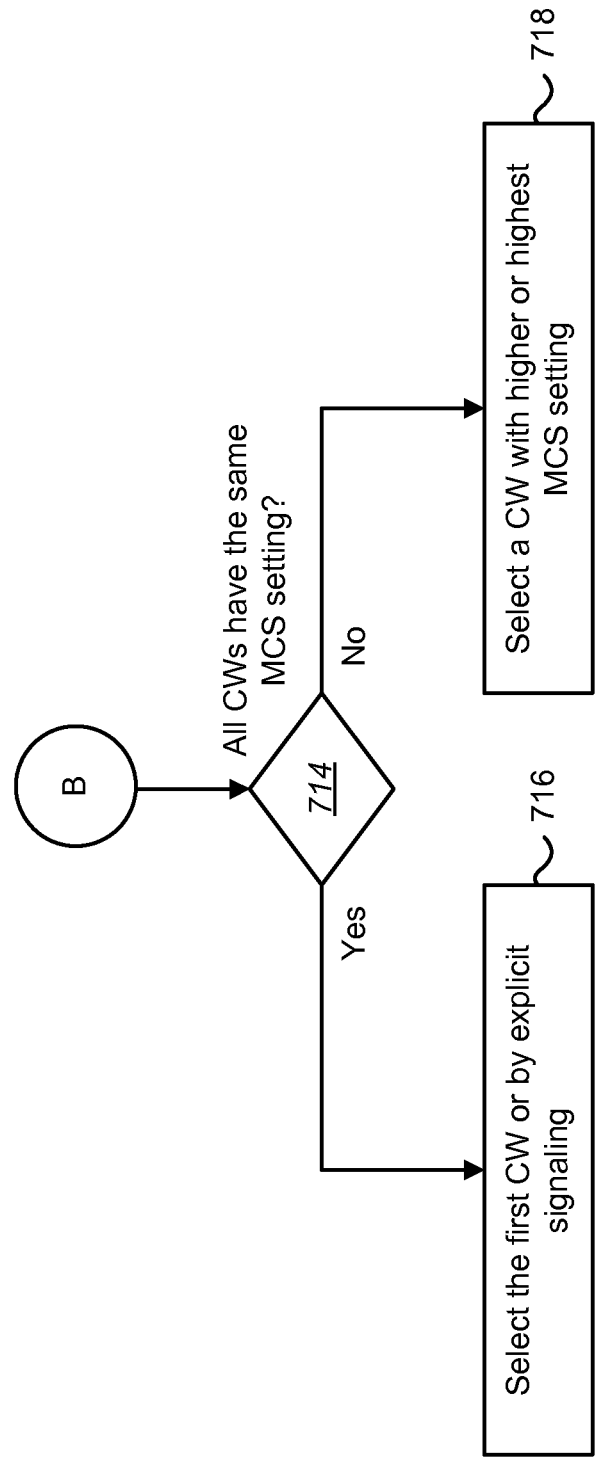

One configuration of the method 700 may perform codeword 124 selection using an MCS setting. In this configuration, codeword selection 104 may be based on a Modulation and Coding Scheme (MCS) setting. This configuration is illustrated in FIG. 7B. In this configuration, if codewords 124 have different MCS settings, a codeword 124 with a higher MCS setting (which may imply higher TBS and better channel quality) may be selected by the wireless communication device 102. If codewords 124 have the same MCS setting, the wireless communication device 102 may select a first codeword 124, may follow explicit CW selection signaling from the eNB 212 or may explicitly signal the codeword selection (to the eNB 212).

As illustrated in FIG. 7B, operation may continue from connector B in FIG. 7A. For example, if the wireless communication device 102 determines 704 that the number of codewords 124 used is greater than one (e.g., two or more), the wireless communication device 102 may determine 714 whether all of the codewords 124 have the same MCS setting (e.g., MCS setting 686). If the wireless communication device 102 determines 714 that not all of the codewords 124 have the same MCS setting, the wireless communication device 102 may select 718 a codeword 124 with a higher or highest MCS setting (e.g., MCS setting 686). If the wireless communication device 102 determines 714 that all of the codewords 124 have the same MCS setting, the wireless communication device 102 may select 716 the first codeword 124 or may follow explicit signaling of CW selection if available. When using explicit signaling, the eNB 212 may inform the wireless communication device 102 on the CW selection with the UCI Report Configuration 246 or the wireless communication device 102 may send a message to the base station 112 that indicates the selected codeword 124.

In another configuration, static/semi-static codeword selection may be performed using an MCS setting and base station 112 scheduling. In this configuration, the eNB 212 may inform the wireless communication device 102 on the CW selection with a UCI Report Configuration 246. The MCS settings (e.g., MCS settings 686) may be controlled by the base station 112 (e.g., eNB 212). Accordingly, the base station 112 (e.g., eNB 212) may modify the MCS setting and antenna port numbers to allow static or semi-static codeword selection. For example, the base station 112 (e.g., eNB 212) may set static codeword selection on the first codeword 124 by always setting a higher (or the same) MCS setting (e.g., 686) on the first antenna port. When the channel condition changes, the base station 112 (e.g., eNB 212) may switch the antenna port number to maintain a higher (or same) MCS setting for the first codeword 124.

Dynamic codeword selection may further use the HARQ process with the MCS setting. This may be further divided into two approaches depending on the configuration. The eNB 212 may inform the wireless communication device 102 on the CW selection preferences or settings of HARQ considerations with the UCI Report Configuration 246.

Figure 7C:
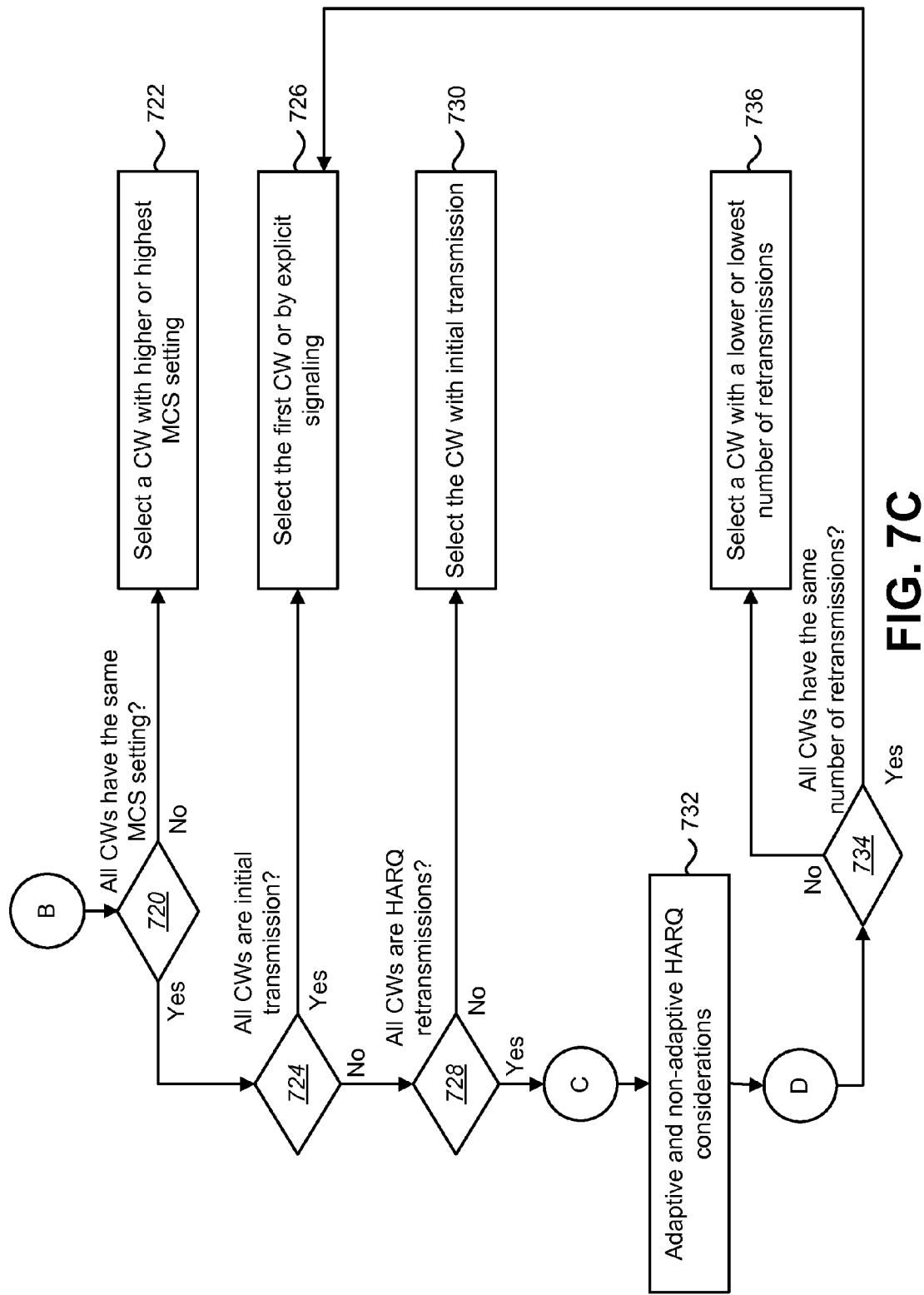

In another configuration, dynamic codeword 124 selection using MCS and HARQ preferences of initial transmission may be performed as illustrated in FIG. 7C. In this configuration, an initial transmission codeword 124 (e.g., a codeword 124 carrying an initial transmission) may be preferred over a HARQ retransmission (e.g., a HARQ retransmission codeword 124) because it has more chances to be retransmitted when in error. Similarly, a codeword 124 with a smaller number of retransmissions in a HARQ process may be preferred over a codeword 124 with a higher number of retransmissions. The codeword selection 104 according to this configuration is described as follows.

In this configuration (illustrated in FIG. 7C), operation may continue from connector B in FIG. 7A. For example, if the wireless communication device 102 determines 704 that the number of codewords 124 used is greater than one (e.g., two or more), the wireless communication device 102 may determine 720 whether all of the codewords 124 have the same MCS setting (e.g., MCS setting 686). If the wireless communication device 102 determines 720 that not all of the codewords 124 have the same MCS setting, the wireless communication device 102 may select 722 a codeword 124 with a higher or highest MCS setting (e.g., MCS setting 686). For example, if the codewords 124 have different MCS settings, the wireless communication device 102 may select 722 the codeword 124 with a higher MCS setting (which may imply a higher TBS and better channel quality).

If the wireless communication device 102 determines 720 that all of the codewords 124 have the same MCS setting, the wireless communication device 102 may determine 724 whether all codewords 124 are initial transmissions. If all of the codewords 124 are initial transmissions, the wireless communication device 102 may follow explicit signaling of a CW selection, if available.

Figure 7D:
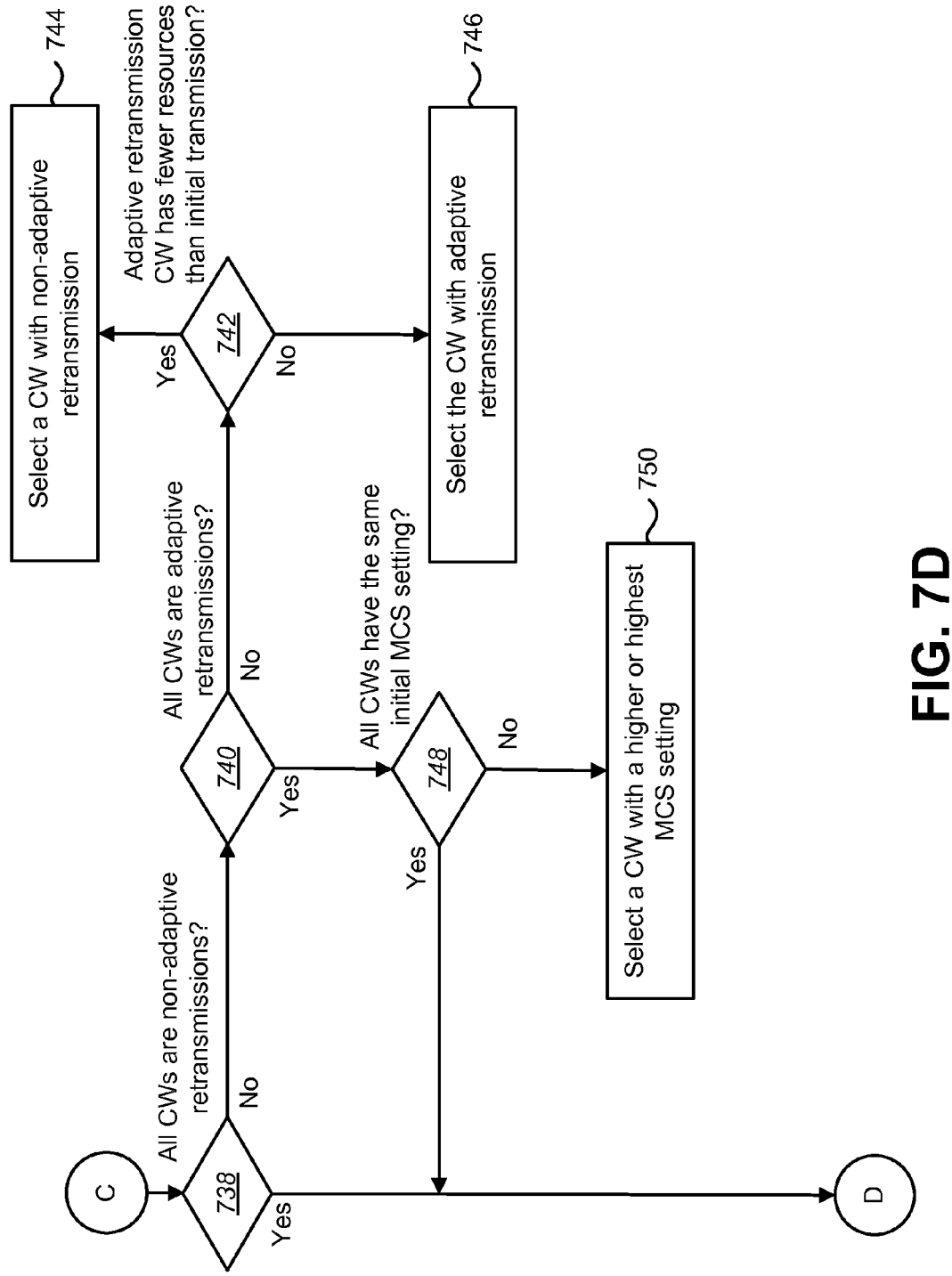

If not all of the codewords 124 are initial transmissions, the wireless communication device 102 may determine 728 whether all codewords 124 are HARQ retransmissions. If not all of the codewords 124 are initial transmissions, the wireless communication device 102 may select 730 a codeword 124 with an initial transmission. For example, if one of the codewords 124 is (or carries) a HARQ retransmission, and another codeword 124 is an initial transmission, the wireless communication device 102 may select 730 the initial transmission codeword 124. If all of the codewords 124 are HARQ retransmissions, the wireless communication device 102 may optionally follow connector C. For example, if HARQ feedback is received by the wireless communication device 102, the wireless communication device 102 may optionally determine whether they are adaptive or non-adaptive retransmissions. In other words, the wireless communication device 102 may optionally use 732 adaptive and non-adaptive considerations, which are illustrated in FIG. 7D. The adaptive and non-adaptive considerations 732 will be explained in more detail in relation to FIG. 7D below.

If the wireless communication device determines 728 that all of the codewords 124 are (or carry) HARQ retransmissions and adaptive and non-adaptive HARQ considerations 732 are not used (in one configuration) or if operation returns from adaptive and non-adaptive HARQ considerations 732 at connector D, the wireless communication device 102 may determine 734 whether all codewords 124 have the same number of retransmissions. For example, the wireless communication device 102 may compare the number of retransmissions 684 of each codeword 124. If the wireless communication device 102 determines 734 that not all of the codewords 124 have the same number of retransmissions, the wireless communication device 102 may select 736 a codeword with a lower or lowest number of retransmissions (using the number of HARQ retransmissions 684, for example). For example, the wireless communication device 102 may compare the number of retransmissions of the codewords 124 and select the codeword 124 with a smaller number of retransmissions. If the wireless communication device 102 determines 734 that all of the codewords 124 have the same number of retransmissions, the wireless communication device 102 may select 726 the first codeword 124 or follow explicit signaling of CW selection, if available.

More detail is now given regarding adaptive and non-adaptive HARQ considerations as illustrated in FIG. 7D. As illustrated, operation may continue from connector C (in FIG. 7C or 7E depending on the configuration, for example). The wireless communication device 102 may determine 738 whether all of the codewords 124 are non-adaptive retransmissions. If all of the codewords 124 are non-adaptive retransmissions, operation may proceed to connector D (in FIG. 7C or 7E depending on the configuration, for example).

If the wireless communication device 102 determines 738 that one or more codewords 124 are not non-adaptive retransmissions (e.g., one or more codewords 124 are adaptive retransmissions), the wireless communication device 102 may determine 740 whether all of the codewords 124 are adaptive retransmissions. If not all of the codewords 124 are adaptive retransmissions, the wireless communication device 102 may determine 742 whether an adaptive retransmission codeword has or uses fewer resources than an initial transmission. For example, if a codeword 124 is a non-adaptive retransmission and another codeword 124 is an adaptive retransmission, the wireless communication device 102 may compare the resources used for the adaptive retransmission 639 against the resources used for its initial transmission 637.

If the wireless communication device 102 determines 742 that (one or more codewords 124 using) the adaptive retransmission has or uses fewer resources than its initial transmission, the wireless communication device 102 may select 744 a codeword 124 with non-adaptive retransmission (e.g., and avoid selecting a codeword 124 with adaptive retransmission). Otherwise, if the wireless communication device 102 determines 742 that the resources used for the adaptive retransmission codeword 124 are more than its initial transmission, the wireless communication device 102 may select 746 the codeword 124 with adaptive retransmission.

If the wireless communication device 102 determines 740 that all of the codewords 124 are adaptive retransmissions, the wireless communication device 102 may determine 748 whether all of the codewords 124 have the same initial MCS setting (e.g., MCS setting 686). If all of the codewords 124 do not have the same initial MCS setting, the wireless communication device 102 may select 750 a codeword with a higher or highest initial MCS setting. If the initial MCS settings are the same for all of the codewords 124, operation may proceed to connector D (in FIG. 7C or 7E depending on the configuration, for example).

In another configuration (illustrated in FIG. 7E), dynamic codeword 124 selection using MCS and HARQ preferences of retransmission may be performed. In this configuration, multiplexing CQI 238 and/or PMI 236 on a retransmission codeword 124 may cause less system degradation since there is already a copy of the codeword 124 at the receiver (e.g., the base station 112 or eNB 212) and HARQ soft-combining may achieve better performance than the initial transmission only. In this configuration, a HARQ retransmission codeword 124 may be preferred over an initial transmission codeword 124. Similarly, a codeword 124 with a higher number of retransmissions may be preferred over a codeword 124 with a lower number of retransmissions. An exception may be given on a last retransmission to reduce or minimize the probability of triggering upper layer retransmissions. This codeword selection mechanism configuration is described as follows.

Figure 7E:
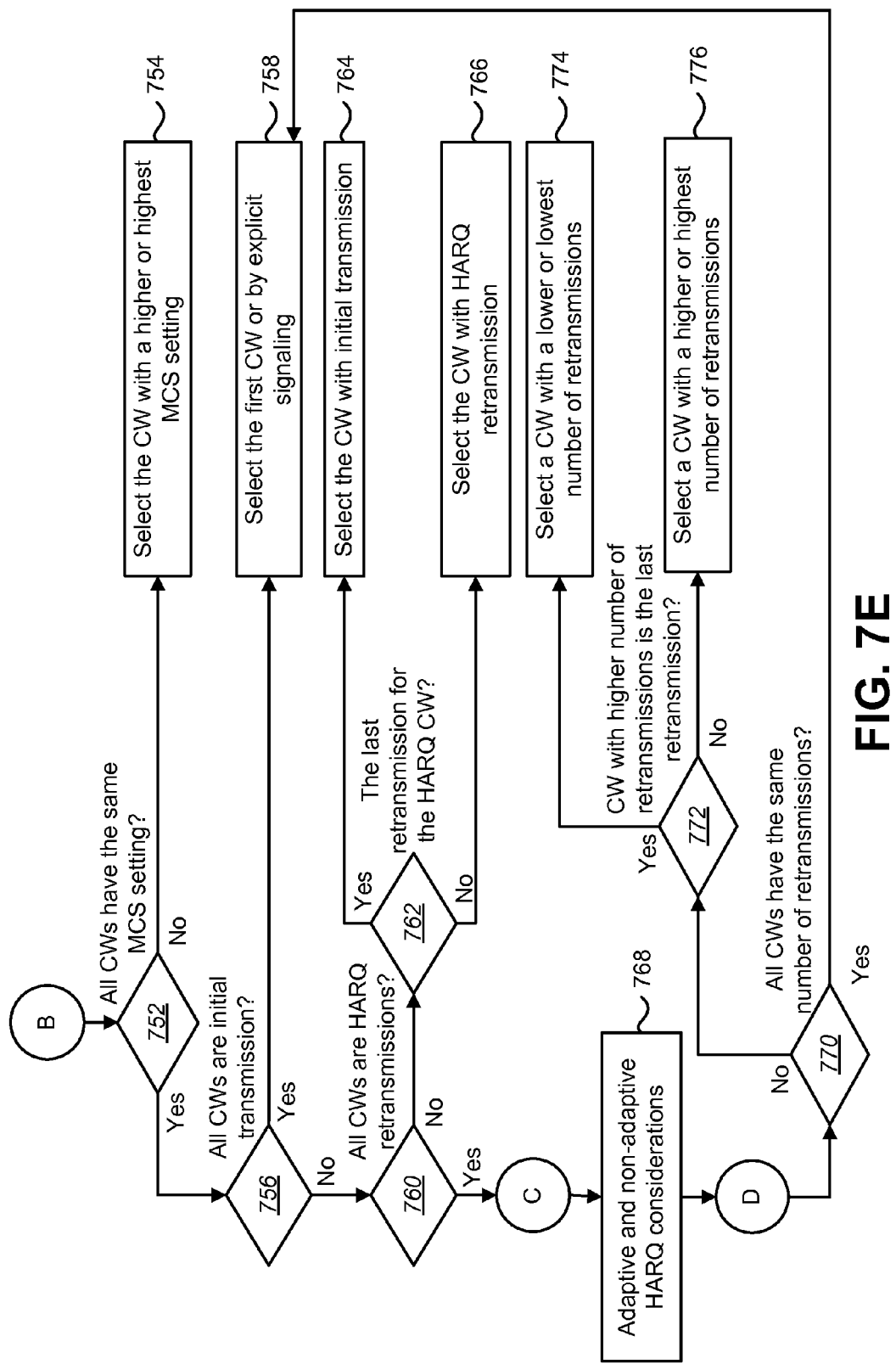

As illustrated in FIG. 7E, operation may continue from connector B as illustrated in FIG. 7A. In this configuration, the wireless communication device 102 may determine 752 whether all of the codewords 124 have the same MCS setting (e.g., MCS setting 686). If all of the codewords 124 do not have the same MCS setting (e.g., they have different MCS settings), the wireless communication device 102 may select 754 a codeword 124 with a higher or highest MCS setting. A higher MCS setting may imply a higher TBS (e.g., TBS 688) and better channel quality (e.g., channel quality 690).

If the wireless communication device 102 determines 752 that all of the codewords 124 have the same MCS setting, the wireless communication device 102 may determine 756 whether all of the codewords 124 are initial transmissions. If all of the codewords 124 are initial transmissions, the wireless communication device 102 may select 758 the first codeword 124 or follow explicit signaling of CW selection, if available.

If the wireless communication device 102 determines 756 that not all of the codewords 124 are initial transmissions, the wireless communication device 102 may determine 760 whether all of the codewords 124 are HARQ retransmissions. If not all of the codewords 124 are HARQ retransmissions, the wireless communication device 102 may determine 762 whether it is the last retransmission for a HARQ codeword 124. For example, if a codeword 124 is (or carries) a HARQ retransmission, and another codeword 124 is an initial transmission, the wireless communication device 102 may determine 762 whether this is the last retransmission for the HARQ retransmission codeword 124. If it is the last retransmission for the HARQ retransmission codeword 124, the wireless communication device 102 may (avoid it and) select 764 an initial transmission codeword 124 for CQI 238 and/or PMI 236 multiplexing. If it is not the last retransmission, the wireless communication device 102 may select 766 the HARQ retransmission codeword 124 for multiplexing CQI 238 and/or PMI 236.

If the wireless communication device 102 determines 760 that all of the codewords 124 are HARQ retransmissions, operation may optionally proceed to connector C (illustrated in FIG. 7D) to determine 738 whether all of the codewords 738 are non-adaptive retransmissions. That is, the wireless communication device 102 may use 768 adaptive and non-adaptive HARQ considerations 768. Alternatively, operation may skip the adaptive and non-adaptive HARQ considerations 768.

In the case where adaptive and non-adaptive considerations 768 are used, operation may proceed to connector C in FIG. 7D. For example, if HARQ feedback is received by the wireless communication device 102, the wireless communication device 102 may determine 738 whether they are adaptive or non-adaptive retransmissions as illustrated in FIG. 7D. More specifically, the wireless communication device 102 may determine 738 whether all of the codewords 124 are non-adaptive retransmissions. If all of the codewords 124 are non-adaptive retransmissions, operation may proceed to connector D (as illustrated in FIG. 7C or 7E). If one or more codewords 124 are not non-adaptive retransmissions, the wireless communication device 102 may determine 740 whether they are all adaptive retransmissions. If a codeword 124 is a non-adaptive retransmission and another codeword 124 is an adaptive retransmission, the wireless communication device 102 may determine 742 whether an adaptive retransmission codeword 124 has or uses fewer resources than an initial transmission. This may be accomplished by comparing the resources used for the adaptive retransmission against (the resources used for) its initial transmission. If the adaptive retransmission uses fewer resources than the initial transmission, the wireless communication device 102 may avoid selecting the adaptive retransmission codeword 124 and may select 744 a codeword 124 with a non-adaptive retransmission. Otherwise, if the resources used for the adaptive retransmission codeword 124 are more than the resources used for the initial transmission, the wireless communication device 102 may select 746 the adaptive retransmission codeword 124.

If the wireless communication device 102 determines 740 that all of the codewords 124 are adaptive retransmissions, the wireless communication device 102 may determine 748 whether all of the codewords 124 have the same initial MCS setting. If all of the codewords 124 do not have the same initial MCS setting, the wireless communication device 102 may select 750 a codeword 124 with a higher or highest initial MCS setting. If the initial MCS settings of the codewords 124 are the same operation may proceed to connector D (as illustrated in FIG. 7C or 7E, for example).

If adaptive and non-adaptive HARQ considerations 768 are skipped or if operation returns from adaptive and non-adaptive HARQ considerations 768 at connector D, the wireless communication device 102 may determine 770 whether all of the codewords 124 have the same number of retransmissions (e.g., using the number of HARQ retransmissions 684). For example, the wireless communication device 102 may compare the number of retransmissions 684 of the codewords 124. If all of the codewords 124 have the same number of retransmissions, the wireless communication device 102 may select 758 the first codeword 124 or follow explicit signaling of CW selection, if available. If not all of the codewords have the same number of retransmissions, the wireless communication device 102 may determine 772 whether a codeword 124 with a higher number of retransmissions is the last retransmission. If this is the last retransmission for the codeword 124 with a higher number of HARQ retransmissions, the wireless communication device 102 may avoid it and select 774 a codeword 124 with a lower or lowest number of retransmissions for CQI 238 and/or PMI 236 multiplexing. If it is not the last retransmission for the codeword 124 with a higher number of retransmissions, the wireless communication device 102 may select 776 the codeword 124 with a higher or highest number of HARQ retransmissions to multiplex CQI 238 and/or PMI 236.

Figure 8:
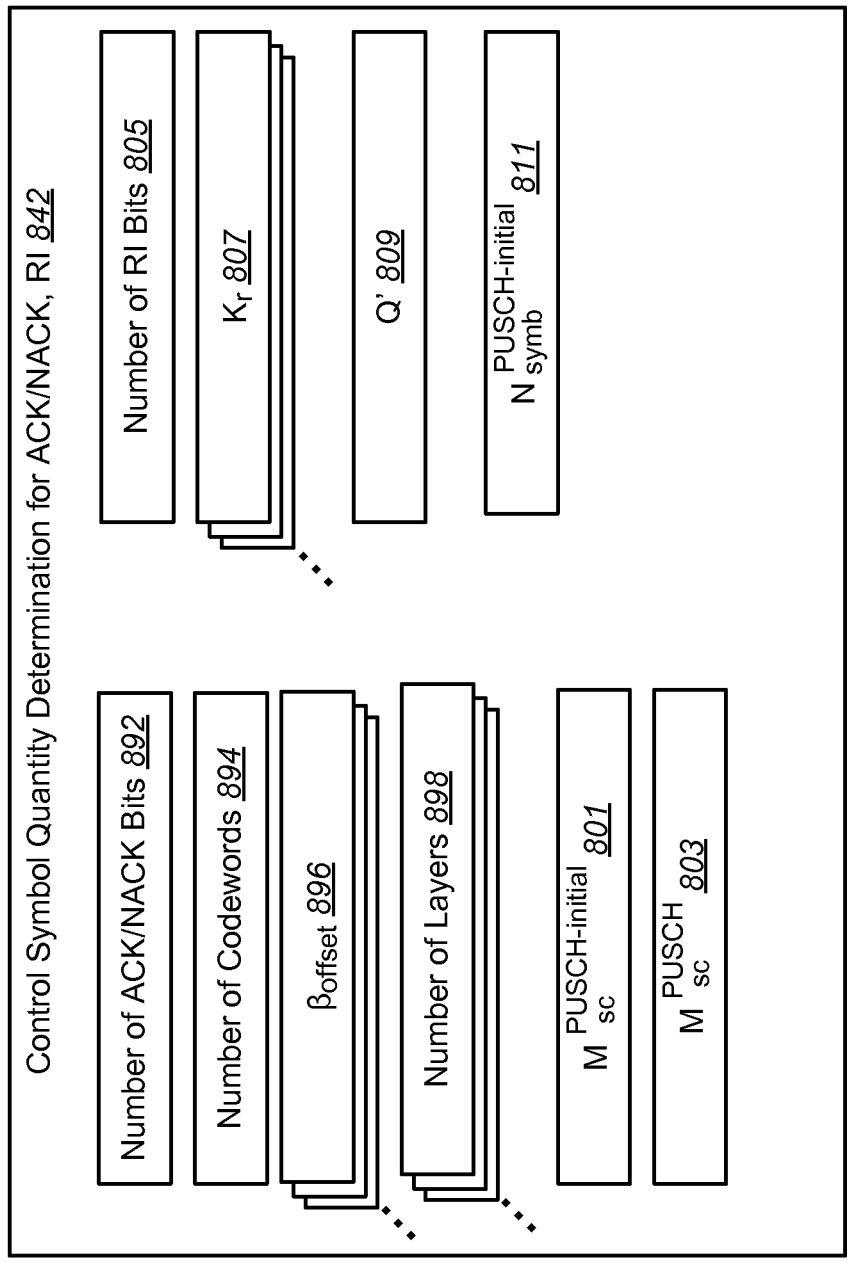
FIG. 8 is a block diagram illustrating one configuration of a control symbol quantity determination module for Acknowledgement/Negative Acknowledgement (ACK/NACK) and/or Rank Indicator (RI)

FIG. 8 is a block diagram illustrating one configuration of a control symbol quantity determination module 842 for Acknowledgement/Negative Acknowledgement (ACK/NACK) and/or Rank Indicator (RI). The control symbol quantity determination module 842 may include and/or use one or more parameters or pieces of information in order to determine a control symbol quantity for ACK/NACK and/or RI. For example, the control symbol quantity determination module 842 may include and/or use a number of ACK/NACK bits 892, a number of codewords 894, one or more $\beta_{offset}$ values 896, one or more numbers of layers 898 (e.g., for codewords 124), an $M_{sc}^{PUSCH\text{-}initial}$ 801, an $M_{sc}^{PUSCH}$ 803, a number of RI bits 805, one or more $K_r$ values 807 (where $K_r$ is decided by the Modulation and Coding Scheme (MCS) setting 254 and the number of subcarriers (e.g., $N_{PRB}$) provided by the PUSCH Resource Information 250), a Q' 809 and/or an $N_{symb}^{PUSCH\text{-}initial}$ 811. More detail on these parameters 892, 894, 896, 898, 801, 803, 805, 807, 809, 811 follows.

In one configuration for A/N 232 and RI 234, the UCI symbols (e.g., 216b) may be time-aligned across all layers 222. The number of symbols on each layer 222 may need to be determined. In Release-8, for example, there may be only one CW 224 per layer 222 on the PUSCH 220. Thus, a single $\beta_{offset}$ 896 may be sufficient to define the number of code control bits for A/N and RI. With SU-MIMO, however, multiple CWs 224 and multiple layers 222 may be used. Since the UCI symbols (e.g., UCI B 216b) may be time-aligned across all layers 222, the corresponding $\beta_{offset}$ 896 on each layer 222 may be different. If the same $\beta_{offset}$ 896 is applied on each layer 222, the time alignment may not be guaranteed. Furthermore, using time alignment with $\beta_{offset}$ on the best or worst layer, the control (e.g., UCI B 216b) may be under-protected or over-protected, respectively. Thus, the $\beta_{offset}$ 896 in the SU-MIMO case may be defined as the sum of the redundancy over all layers 222.

One configuration for determining the number of symbols on each layer 222 is described as follows. In this configuration, A/N 232 and RI 234 are time-aligned across all layers 222, which may be analogous to a rank-1 transmission. One approach is to extend the Release-8 procedure by treating all CWs 224 on all layers 222 as aggregated data. This is illustrated in Equation (11).

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right) \quad (11)$$

In Equation (11), O is the number of ACK/NACK 232 bits 892 and/or rank indicator (RI) 234 bits 805, C 894 is the number of CWs 894, $K_r$ 807 is the turbo code interleaver size for a CW 224. $M_{sc}^{PUSCH}$ 803 is the number of subcarriers for PUSCH transmission in the current sub-frame for the transport block expressed as a number of subcarriers. $M_{sc}^{PUSCH-initial}$ 801 is the number of subcarrier for initial PUSCH transmission for the same transport block, $N_{symb}^{PUSCH-initial}$ 811 is the number of Single Carrier-Frequency Division Multiple Access (SC-FDMA) symbols per subframe for initial PUSCH transmission for the same transport block given by $N_{symb}^{PUSCH-initial}=(2 \cdot (N_{symb}^{UL}-1)-N_{SRS})$. $N_{SRS}$ is equal to 1 if the UE is configured to send PUSCH and SRS in the same subframe for an initial transmission or if the PUSCH resource allocation for initial transmission even partially overlaps with the cell specific SRS subframe and bandwidth configuration. Otherwise, $N_{SRS}$ is equal to 0. The sum of $K_r$ for all the CWs 224 may be used in the denominator.

Equation (11) may be alternatively explained as follows. A/N 232 and RI 234 may be interleaved on all layers 222. Accordingly, a $\beta_{offset}$ value 896 may be calculated for each layer 222. The sum of the $\beta_{offset}$ 896 on all layers 222 should be equal to the desired $\beta_{offset}$ value.

For example, assuming Q' symbols 809 on each layer 222, the $\beta_{offset}$ 896 for each layer 222 may be given as illustrated in Equation (12).

$$\beta_{offset}^{PUSCH}{}_i = \frac{Q'(K_{rj}/L_j)}{O \cdot M_{sc}^{PUSCH-initial} \cdot N_{symb}^{PUSCH-initial}} \quad (12)$$

In Equation (12), layer i 222 is mapped to the $j^{th}$ CW 224. $Kr_j$ 807 is the interleaver size of $j^{th}$ CW 224 for j=0,...,C−1, and $L_j$ 898 is the number of layers 898 of the $C^{th}$ CW 224. The total $\beta_{offset}$ 896 may be expressed as illustrated in Equation (13).

$$\beta_{offset}^{PUSCH} = \sum_{i=1}^{L_{sum}} \beta_{offset}^{PUSCH}{}_i \quad (13)$$

$$= \sum_{i=1}^{L_{sum}} \frac{Q'(K_{rj}/L_j)}{O \cdot M_{sc}^{PUSCH-initial} \cdot N_{symb}^{PUSCH-initial}}$$

$$= \frac{Q' \sum_{r=0}^{C-1} K_r}{O \cdot M_{sc}^{PUSCH-initial} \cdot N_{symb}^{PUSCH-initial}}$$

In Equation (13), L is the total number of layers 222 for transmission, where $$L_{sum} = \sum_{i=0}^{C-1} L_i.$$

Thus, given the desired $\beta_{offset}$ value 896, the desired Q' 809 can be obtained as illustrated in Equation (14).

$$Q' = \frac{O \cdot M_{sc}^{PUSCH-initial} \cdot N_{symb}^{PUSCH-initial} \cdot \beta_{offset}^{PUSCH}}{\sum_{r=0}^{C-1} K_r} \quad (14)$$

The UCI (e.g., UCI B 216b) may be mapped to an integer number of symbols. Thus, the same result is obtained. That is, $$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right).$$

In this configuration, $\beta_{offset}$ 896 is proportionally distributed across layers 222, with lower layer 222/CW 224 $\beta_{offset}$ values 896 on the layer 222/CW 224 with higher MCS settings, for example.

In another configuration, a more conservative approach (which may guarantee control performance, for example) comprises calculating Q' 809 based on the worst layer 222 setting. In this configuration, let the expected $\beta_{offset}$ 896 on a layer be described as $$\beta_{offset}^{PUSCH}\Big|_{layer} = \frac{\beta_{offset}^{PUSCH}}{L_{sum}}.$$

Then, $Q'_i$ may be determined as illustrated in Equation (15).

$$Q'_i = \frac{O \cdot M_{sc}^{PUSCH-initial} \cdot N_{symb}^{PUSCH-initial} \cdot \beta_{offset}^{PUSCH}\Big|_{layer}}{(K_{rj}/L_j)} \quad (15)$$

$$= \frac{O \cdot M_{sc}^{PUSCH-initial} \cdot N_{symb}^{PUSCH-initial} \cdot \beta_{offset}^{PUSCH}}{(K_{rj}/L_j) \cdot L_{sum}}$$

Ceiling into an integer number of symbols and limited by the PUSCH resources, Equation (16) may be obtained.

$$Q'_i = \min\left(\left\lceil \frac{O \cdot M_{sc}^{PUSCH-initial} \cdot N_{symb}^{PUSCH-initial} \cdot \beta_{offset}^{PUSCH}}{(K_{rj}/L_j) \cdot L_{sum}} \right\rceil, 4 \cdot M_{sc}^{PUSCH}\right) \quad (16)$$

Furthermore, Q' 809 may be determined as illustrated in Equation (17).

$$Q' = \max(Q'_i) i=1, \ldots, L_{sum} \quad (17)$$

This configuration may ensure that the $\beta_{offset}$ 896 is maintained even for the worst codeword 224 and layer 222. On the other hand, it protects the A/N 232 and RI 234 with higher overhead compared with the configuration illustrated in Equations (11)-(14).

Figure 9:
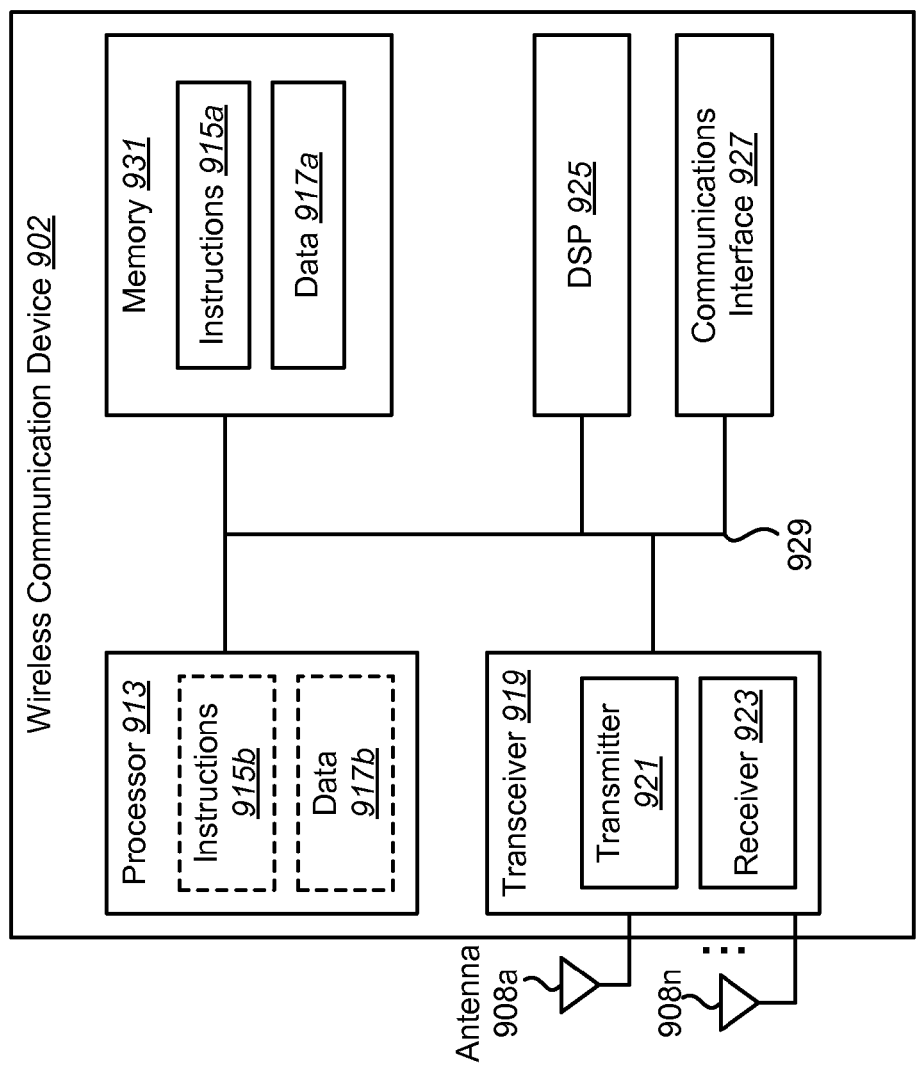
FIG. 9 illustrates various components that may be utilized in a wireless communication device.

FIG. 9 illustrates various components that may be utilized in a wireless communication device 902. The wireless communication device 902 may be utilized as the wireless communication device 102 or UE 202 illustrated previously. The wireless communication device 902 includes a processor 913 that controls operation of the wireless communication device 902. The processor 913 may also be referred to as a CPU. Memory 931, which may include both read-only memory (ROM), random access memory (RAM) or any type of device that may store information, provides instructions 915*a* and data 917*a* to the processor 913. A portion of the memory 931 may also include non-volatile random access memory (NVRAM). Instructions 915*b* and data 917*b* may also reside in the processor 913. Instructions 915*b* and/or data 917*b* loaded into the processor 913 may also include instructions 915*a* and/or data 917*a* from memory 931 that were loaded for execution or processing by the processor 913. The instructions 915*b* may be executed by the processor 913 to implement the systems and methods disclosed herein.

The wireless communication device 902 may also include a housing that contains a transmitter 921 and a receiver 923 to allow transmission and reception of data. The transmitter 921 and receiver 923 may be combined into a transceiver 919. One or more antennas 908*a-n* are attached to the housing and electrically coupled to the transceiver 919.

The various components of the wireless communication device 902 are coupled together by a bus system 929 which may include a power bus, a control signal bus, and a status signal bus, in addition to a data bus. However, for the sake of clarity, the various buses are illustrated in FIG. 9 as the bus system 929. The wireless communication device 902 may also include a digital signal processor (DSP) 925 for use in processing signals. The wireless communication device 902 may also include a communications interface 927 that provides user access to the functions of the wireless communication device 902. The wireless communication device 902 illustrated in FIG. 9 is a functional block diagram rather than a listing of specific components.

Figure 10:
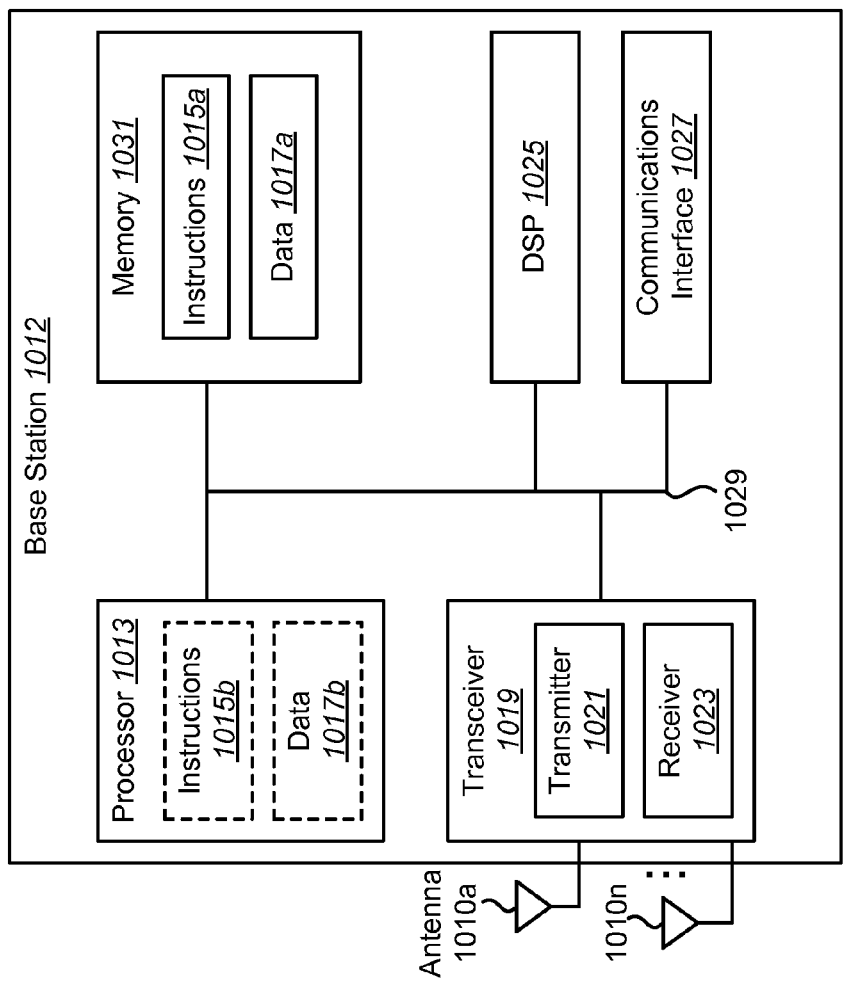
FIG. 10 illustrates various components that may be utilized in a base station.

FIG. 10 illustrates various components that may be utilized in a base station 1012. The base station 1012 may be utilized as the base station 112 or eNB 212 illustrated previously. The base station 1012 may include components that are similar to the components discussed above in relation to the wireless communication device 902, including a processor 1013, memory 1031 that provides instructions 1015*a* and data 1017*a* to the processor 1013, instructions 1015*b* and data 1017*b* that may reside in or be loaded into the processor 1013, a housing that contains a transmitter 1021 and a receiver 1023 (which may be combined into a transceiver 1019), one or more antennas 1010*a-n* electrically coupled to the transceiver 1019, a bus system 1029, a DSP 1025 for use in processing signals, a communications interface 1027, and so forth.

The term "computer-readable medium" or "processor-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another, combined into a single step or incorporated into other ancillary aspects of the communication system without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A wireless communication device in communication with a base station, comprising:
   a determining unit configured to determine the number of symbols per layer for uplink control information for transmission on a plurality of layers; and
   a transmitting unit configured to transmit the uplink control information on the plurality of layers on a physical uplink shared channel, wherein
   one or multiple transport blocks multiplexed with the uplink control information are transmitted on the plurality of layers.

2. The wireless communication device of claim 1, wherein a $\beta_{offset}$ value is applied in case of determining the number of the symbols per layer for the uplink control information for transmission with multiple transport blocks on the plurality of layers.

3. The wireless communication device of claim 1, wherein the uplink control information comprises an Acknowledgement/Negative Acknowledgement (ACK/NACK).

4. The wireless communication device of claim 2, wherein the uplink control information comprises an Acknowledgement/Negative Acknowledgement (ACK/NACK) and/or a Rank Indicator (RI).

5. The wireless communication device of claim 1, wherein the uplink control information comprises a Rank Indicator (RI).

6. A base station in communication with a wireless communication device, comprising:
   a receiving unit configured to receive the uplink control information on the plurality of layers on a physical uplink shared channel, wherein
   the number of symbols per layer for uplink control information for reception on a plurality of layers is determined by the wireless communication device; one or multiple transport blocks multiplexed with the uplink control information are received on the plurality of layers.

7. The base station of claim 6, wherein a $\beta_{offset}$ value is applied in case of determining the number of the symbols per layer for the uplink control information for transmission with multiple transport blocks on the plurality of layers.

8. The base station of claim 6, wherein the uplink control information comprises an Acknowledgement/Negative Acknowledgement (ACK/NACK).

9. The base station of claim 7, wherein the uplink control information comprises an Acknowledgement/Negative Acknowledgement (ACK/NACK) and/or a Rank Indicator (RI).

10. The base station of claim 6, wherein the uplink control information comprises a Rank Indicator (RI).

11. A method by a wireless communication device for communication with a base station, comprising:
 determining the number of symbols per layer for uplink control information for transmission on a plurality of layers; and
 transmitting the uplink control information on the plurality of layers on a physical uplink shared channel, wherein one or multiple transport blocks multiplexed with the uplink control information are transmitted on the plurality of layers.

12. The method of claim 11, wherein a $\beta_{offset}$ value is applied in case of determining the number of the symbols per layer for the uplink control information for transmission with multiple transport blocks on the plurality of layers.

13. The method of claim 11, wherein the uplink control information comprises an Acknowledgement/Negative Acknowledgement (ACK/NACK).

14. The method of claim 12, wherein the uplink control information comprises an Acknowledgement/Negative Acknowledgement (ACK/NACK) and/or a Rank Indicator (RI).

15. The method of claim 11, wherein the uplink control information comprises a Rank Indicator (RI).

16. A method by a base station for communication with a wireless communication device, comprising:
 receiving the uplink control information on the plurality of layers on a physical uplink shared channel, wherein
 the number of symbols per layer for uplink control information for reception on a plurality of layers is determined by the wireless communication device; and one or multiple transport blocks are received on the plurality of layers.

17. The method of claim 16, wherein a $\beta_{offset}$ value is applied in case of determining the number of the symbols per layer for the uplink control information for transmission with multiple transport blocks on the plurality of layers.

18. The method of claim 16, wherein the uplink control information comprises an Acknowledgement/Negative Acknowledgement (ACK/NACK).

19. The method of claim 17, wherein the uplink control information comprises an Acknowledgement/Negative Acknowledgement (ACK/NACK) and/or a Rank Indicator (RI).

20. The method of claim 16, wherein the uplink control information comprises a Rank Indicator (RI).

\* \* \* \* \*